(12) United States Patent
McCulloch et al.

(10) Patent No.: US 9,041,622 B2
(45) Date of Patent: May 26, 2015

(54) CONTROLLING A VIRTUAL OBJECT WITH A REAL CONTROLLER DEVICE

(75) Inventors: Daniel J. McCulloch, Kirkland, WA (US); Arnulfo Zepeda Navratil, Kirkland, WA (US); Jonathan T. Steed, Redmond, WA (US); Ryan L. Hastings, Seattle, WA (US); Jason Scott, Kirkland, WA (US); Brian J. Mount, Seattle, WA (US); Holly A. Hirzel, Kirkland, WA (US); Darren Bennett, Seattle, WA (US); Michael J. Scavezze, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 41 days.

(21) Appl. No.: 13/494,989

(22) Filed: Jun. 12, 2012

(65) Prior Publication Data

US 2013/0328762 A1 Dec. 12, 2013

(51) Int. Cl.
*G09G 5/00* (2006.01)
*G02B 27/01* (2006.01)
*G06F 3/01* (2006.01)

(52) U.S. Cl.
CPC ............... *G02B 27/01* (2013.01); *G06F 3/012* (2013.01); *G06F 3/013* (2013.01); *G06F 3/016* (2013.01); *G06F 3/017* (2013.01); *G02B 27/017* (2013.01); *G02B 2027/0178* (2013.01); *G02B 2027/014* (2013.01); *G02B 2027/0187* (2013.01)

(58) Field of Classification Search
CPC .......................................................... G06F 3/011
USPC ............................................... 345/7, 8, 9, 156
See application file for complete search history.

(56) References Cited

U.S. PATENT DOCUMENTS

| | | | |
|---|---|---|---|
| 6,929,543 B1 | 8/2005 | Ueshima et al. | |
| 7,773,098 B2 | 8/2010 | Okuno et al. | |
| 8,767,968 B2 | 7/2014 | Flaks et al. | |
| 2007/0257906 A1 | 11/2007 | Shimura et al. | |
| 2007/0281766 A1 | 12/2007 | Mullen | |
| 2008/0082311 A1 | 4/2008 | Meijer et al. | |
| 2009/0221368 A1 | 9/2009 | Yen et al. | |
| 2009/0221374 A1 | 9/2009 | Yen et al. | |
| 2009/0300531 A1* | 12/2009 | Pryor .......................... 715/764 |

(Continued)

OTHER PUBLICATIONS

Bowman, et al., "An Evaluation of Techniques for Grabbing and Manipulating Remote Objects in Immersive Virtual Environments", In Proceedings of Symposium on Interactive 3D Graphics, Issue 3, 1997, pp. 35-38, 4 pages.

*Primary Examiner* — Kevin M Nguyen
(74) *Attorney, Agent, or Firm* — Brandon Roper; Judy Yee; Micky Minhas

(57) ABSTRACT

Technology is described for controlling a virtual object displayed by a near-eye, augmented reality display with a real controller device. User input data is received from a real controller device requesting an action to be performed by the virtual object. A user perspective of the virtual object being displayed by the near-eye, augmented reality display is determined. The user input data requesting the action to be performed by the virtual object is applied based on the user perspective, and the action is displayed from the user perspective. The virtual object to be controlled by the real controller device may be identified based on user input data which may be from a natural user interface (NUI). A user selected force feedback object may also be identified, and the identification may also be based on NUI input data.

17 Claims, 20 Drawing Sheets

(56) References Cited

U.S. PATENT DOCUMENTS

| | | |
|---|---|---|
| 2009/0319892 A1 | 12/2009 | Wright et al. |
| 2010/0231581 A1* | 9/2010 | Shroads .................. 345/419 |
| 2010/0265164 A1 | 10/2010 | Okuno |
| 2011/0309919 A1 | 12/2011 | Tidemand et al. |
| 2011/0310002 A1 | 12/2011 | Tidemand et al. |
| 2013/0050069 A1* | 2/2013 | Ota .............................. 345/156 |

* cited by examiner

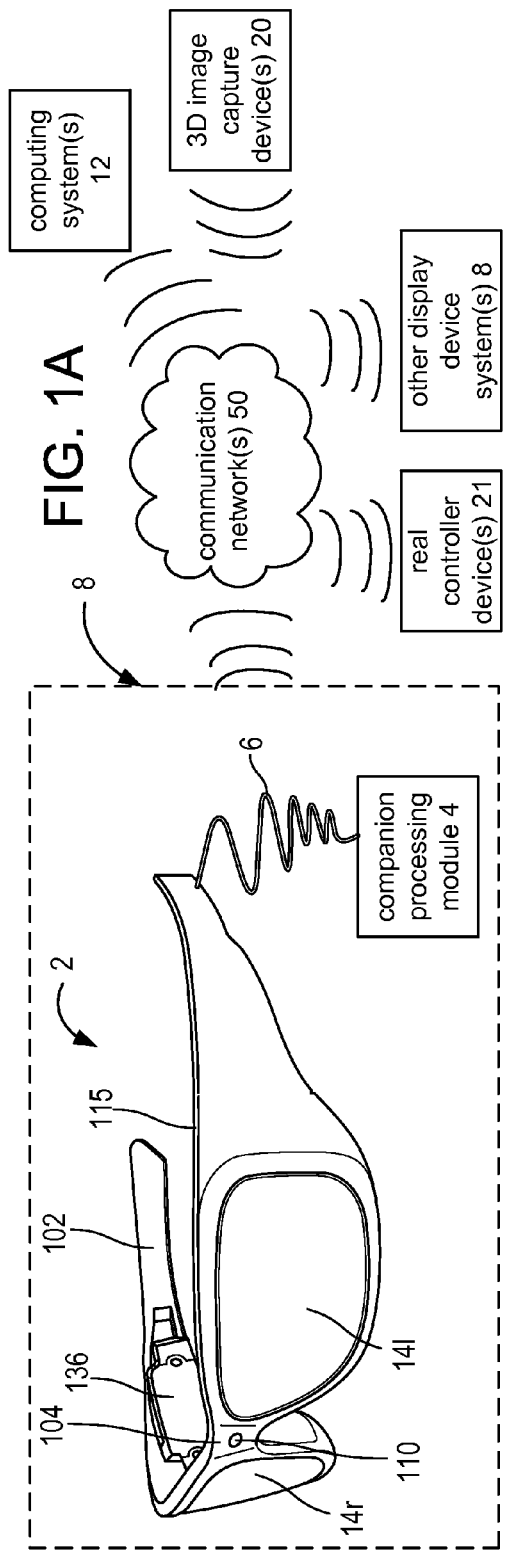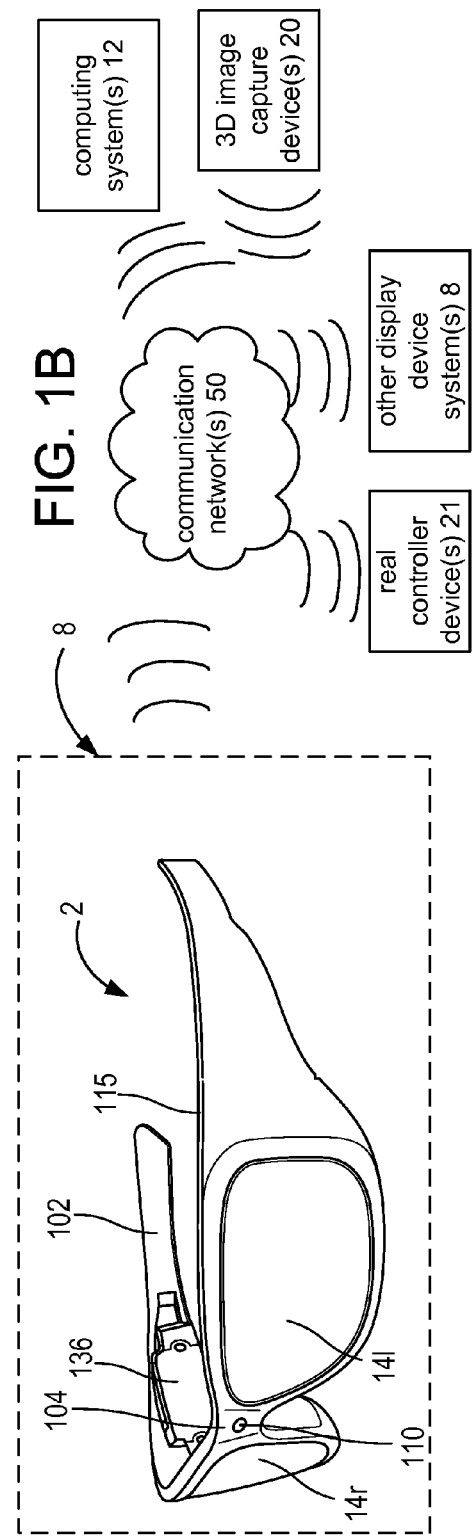

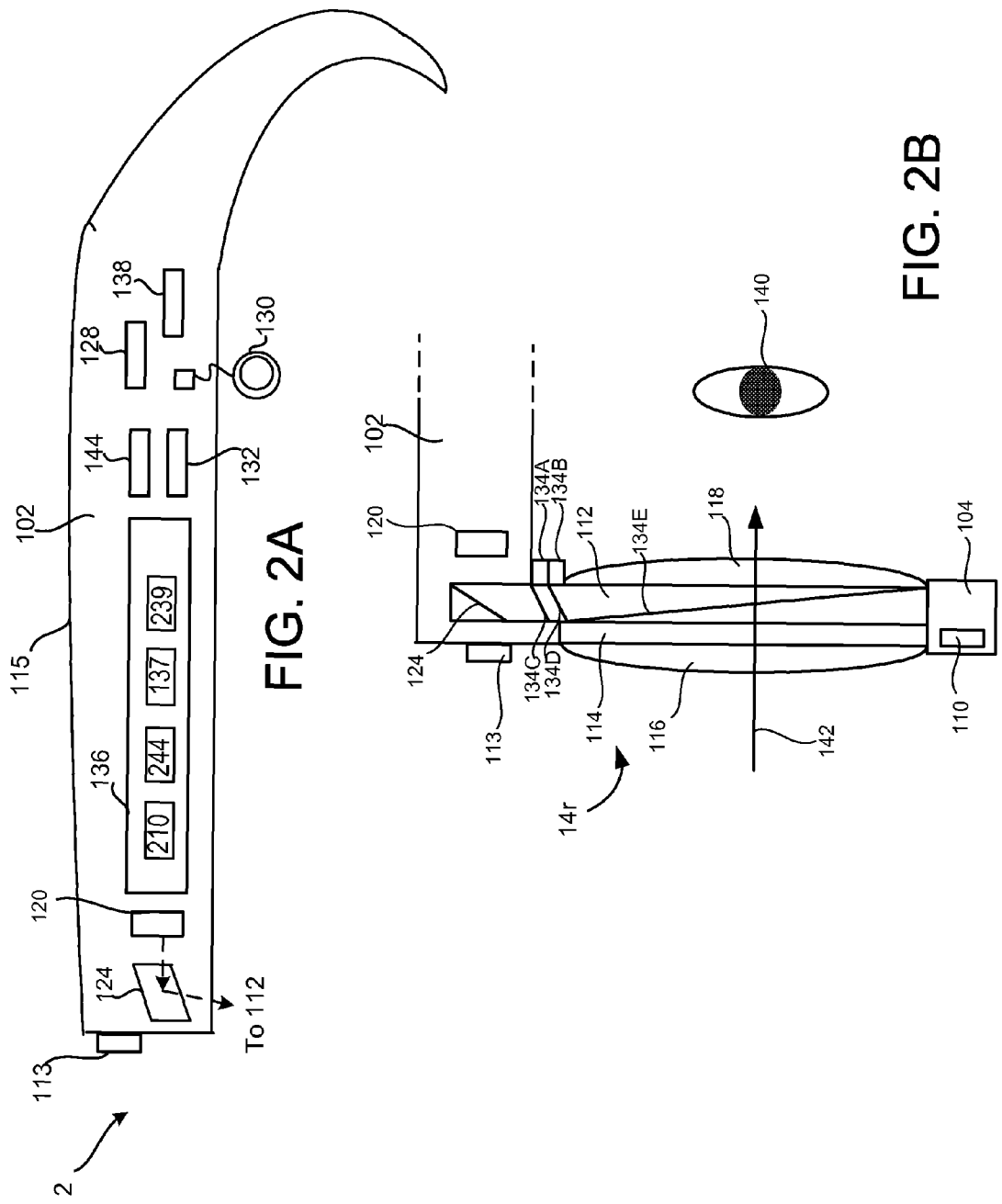

CONTROLLING A VIRTUAL OBJECT WITH A REAL CONTROLLER DEVICE

BACKGROUND

In gaming systems which work with stationary displays like televisions and computer screens, a user often controls action of an object on the display with a real controller device. Besides games, other applications use real controllers as well for controlling some action of an object on the stationary display in the context of an executing application. Although the realism of the stationary display is less than in an augmented reality experience, many users enjoy the touch sensation of using a real controller which directs action.

SUMMARY

The technology described herein provides for controlling an object displayed by a near-eye, augmented reality display with a real controller device. The object may be selected based on user input, often input captured via a natural user interface (NUI). User input requesting an action as determined based on data received from the controller is applied to the object based on the user perspective which changes as the user moves his or her body or moves his or her head when looking through the display. The action being performed by the user selected object is displayed from the user perspective. In some embodiments, the real controller device enhances the user experience by increasing realism with a force feedback mechanism. An example of such a force feedback mechanism is a rumble functionality found in commercially available game controllers.

The technology provides one or more embodiments of a method for controlling a virtual object displayed by a near-eye, augmented reality display with a real controller device. An embodiment of the method comprises receiving user input data from the real controller device requesting an action to be performed by the virtual object. The embodiment of the method further comprises determining a user perspective of the virtual object being displayed by the near-eye, augmented reality display, applying the user input data requesting the action to be performed by the virtual object based on the user perspective, and displaying the action being performed by the virtual object from the user perspective.

The technology provides one or more embodiments of a system for controlling a virtual object displayed by a near-eye, augmented reality display with a real controller device. An embodiment of the system comprises an augmented reality display having a display field of view including a real object and a virtual object and being supported by a near-eye support structure. One or more processors are communicatively coupled to the augmented reality display for controlling the display and are also coupled to at least one capture device for receiving image data and depth data from which the one or more processors determine a three dimensional (3D) mapping of the display field of view and the one or more processors determine a user perspective of the virtual object based on the 3D mapping of the display field of view. The one or more processors are also communicatively coupled to the real controller device for receiving user input data requesting an action to be performed by the virtual object and for applying the user input data requesting the action to be performed by the virtual object based on the user perspective. The one or more processors cause the near-eye, augmented reality display to display the action being performed by the virtual object from the user perspective.

The technology provides one or more embodiments of one or more processor readable storage devices comprising instructions encoded thereon which instructions cause one or more processors to execute a method for providing force feedback for a user selected force feedback object by a real controller device providing input data to a near-eye augmented reality display device system. An embodiment of the method comprises identifying a virtual object to be controlled by a real controller device and identifying, based on received user input data, a user selected force feedback object for which force feedback is to be activated by the real controller device. A user input command received from the real controller device is applied for controlling action of the virtual control object based on the user perspective. A collision is identified between the virtual object being controlled by the real controller device and the user selected force feedback object. A force value is determined for a force acting upon the user selected force feedback object based on physical properties of the virtual object and the user selected force feedback object in the collision. The force value is sent to the real controller device for representing the force value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a block diagram depicting example components of one embodiment of an augmented reality display device system embodied as a near eye, see-through, augmented reality display device system.

FIG. 1B is a block diagram depicting example components of another embodiment of a see-through, augmented reality display device system.

FIG. 2A is a side view of an eyeglass temple of a frame in an embodiment of the optical see-through, augmented reality display device embodied as eyeglasses providing support for hardware and software components.

FIG. 2B is a top view of an embodiment of a display optical system of an optical see-through, near-eye, augmented reality display device.

DETAILED DESCRIPTION

Figure 2C:
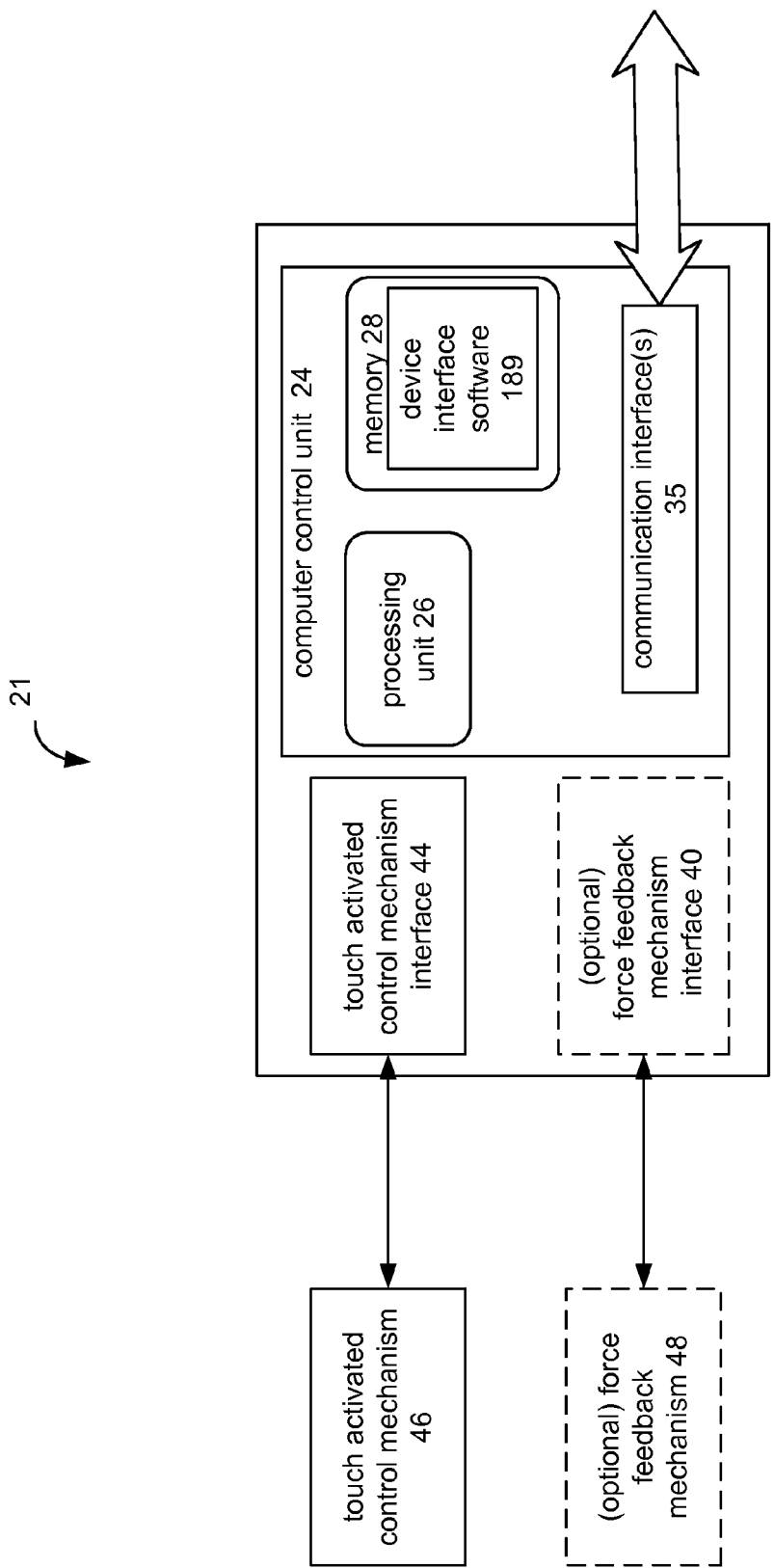
FIG. 2C is a block diagram illustrating example hardware components of an embodiment of a real controller device.

Various technology embodiments are described for controlling a virtual object displayed by a near-eye augmented reality display device system with a real controller device from a user perspective. During execution of an application for the near-eye, augmented reality display, a user perspective of the virtual object is not predetermined. As mentioned above, the user perspective is altered by body movements, including head movements of a user of the near-eye, augmented reality device in a three-dimensional space. Also, a real object may enter and leave a user perspective under its own control. In some embodiments, gaze detected for a user can identify an object of focus or a portion of an object for which an action indicated by the real controller device is to be applied.

A user using a near-eye, augmented reality display device system sees virtual objects displayed with real objects in real time. In particular, a user wearing a see-through, augmented reality display device system actually sees with his or her natural sight a real object, which is not occluded by image data of a virtual object or virtual effects, in a display field of view of the see-through display, hence the names see-through display and optical see-through display. For other types of augmented reality displays like video-see displays, sometimes referred to as video see-through displays, or a display operating in a video-see mode, the display is not really see-through because the user does not see real objects with his natural sight but sees displayed image data of unoccluded real objects as they would appear with natural sight as well as image data of virtual objects and virtual effects. References to a see-through display below are referring to an optical see-through display.

The term "display field of view" refers to the field of view of the display portion of the display device system as the display portion is what the user looks through. In other words, the display field of view approximates a user field of view as seen from a user perspective. In some embodiments, the display field of view, may be mapped by a view dependent coordinate system, having orthogonal X, Y and Z axes in which a Z-axis represents a depth position from a reference point, for example a reference point on or near the display portion of the device.

A user may select an object for control by a real controller device. In some embodiments, the user selection may be identified based on user physical action detected by a natural user interface of the display device system. The selected object may be a virtual object generated by an executing application or a real object for which a representative virtual object is generated and designated as the user selected object for control by the real controller device. As discussed further below, an object which may or may not be the object being controlled with the real controller may also be selected as a force feedback object.

Some examples of the real controller device are a joystick, a steering wheel, a touch pad, a gamepad, a pointing device (e.g. mouse), a trackball assembly, a handheld inertial motion unit (IMU), a touch display (e.g. a touch pad or a multi-point touch pad) or other types of controllers, for example, other types of real controllers typically associated with gaming consoles or game applications. An application with which the real controller device may be providing user input data for the selected object can be other than a game application though. Some real controllers provide a force feedback mechanism. A popular example is a rumble function which uses one or more motors to vibrate a hand-held portion of the controller to represent at least an intensity of a force. The force represented may be a force directed at an object selected as a force feedback object. An example of something which may generate a force is a collision which can be modeled based on physics models for the objects in the collision by a physics engine as discussed further below.

FIG. 1A is a block diagram depicting example components of an embodiment of a see-through, augmented or mixed reality display device system. System 8 includes a near-eye, see-through, augmented reality display device as a near-eye, augmented reality display device 2 in communication with a companion processing module 4 via a wire 6 in this example or wirelessly in other examples. In this embodiment, head mounted display device 2 is in the shape of eyeglasses in a frame 115, with a display optical system 14 for each eye in which image data is projected into a user's eye to generate a display of the image data while a user also sees through the display optical systems 14 for an actual direct view of the real world. The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Each display optical system 14 is also referred to as a see-through, augmented reality display, and the two display optical systems 14 together may also be referred to as a see-through, augmented reality display 14.

Frame 115 provides a support structure for holding elements of the system in place as well as a conduit for electrical connections. In this embodiment, frame 115 provides a convenient eyeglass frame as support for the elements of the system discussed further below. Some other examples of a near-eye support structure are a visor frame or a goggles support. The frame 115 includes a nose bridge 104 with a microphone 110 for recording sounds and transmitting audio data to control circuitry 136. A side arm or temple 102 of the frame rests on each of a user's ears, and in this example the temple 102 is illustrated as including control circuitry 136 for the display device 2.

As illustrated in FIGS. 2A and 2B, an image generation unit 120 is included on each temple 102 in this embodiment as well. Also, not shown in this view, but illustrated in FIGS. 2A and 2B are outward facing capture devices 113, e.g. cameras, for recording digital image data such as still images, video or both, and transmitting the visual recordings to the control circuitry 136 which may in turn send the captured image data to the companion processing module 4 which may also send the data to one or more computer systems 12 over a network 50.

Figure 9:
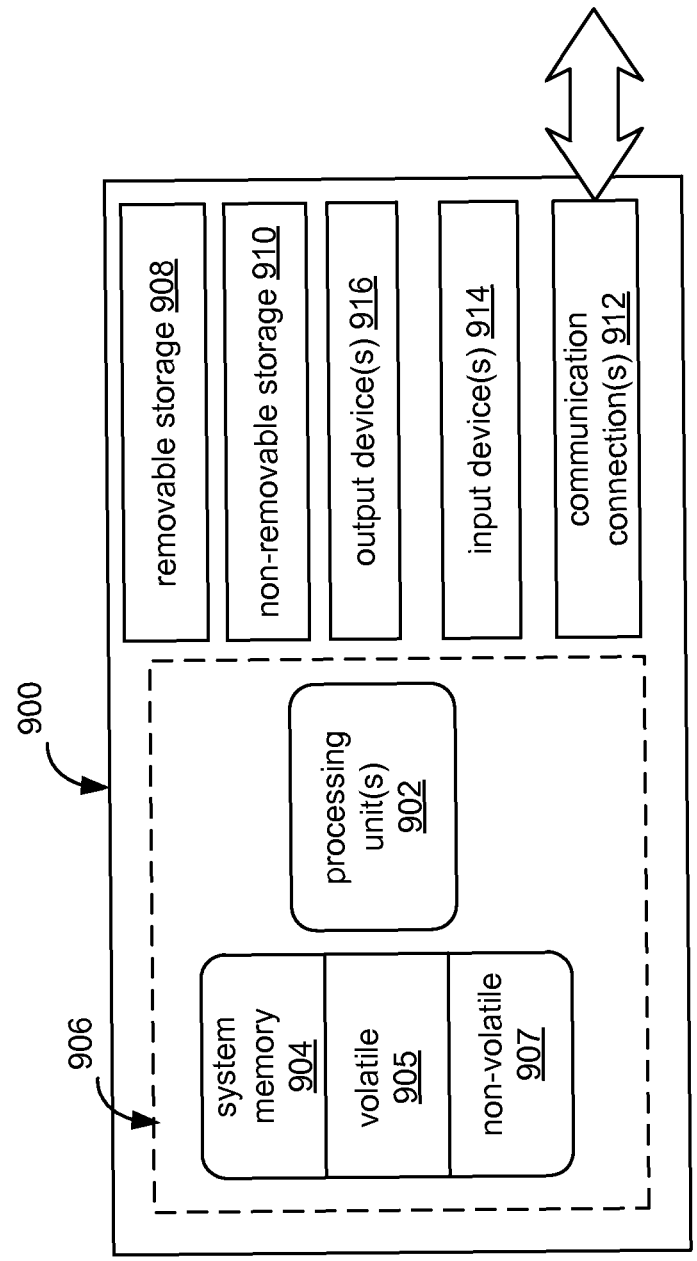
FIG. 9 is a block diagram of one embodiment of a computing system that can be used to implement a network accessible computer system or a companion processing module.

The companion processing module 4 may take various embodiments. In some embodiments, companion processing module 4 is a separate unit which may be worn on the user's body, e.g. a wrist, or be a separate device like a mobile device (e.g. smartphone). The companion processing module 4 may communicate wired or wirelessly (e.g., WiFi, Bluetooth, infrared, RFID transmission, wireless Universal Serial Bus (WUSB), cellular, 3G, 4G or other wireless communication means) over one or more communication networks 50 to one or more computer systems 12 whether located nearby or at a remote location, one or more real controller devices 21, other display device systems 8 in a location or environment and, if available, one or more 3D image capture devices 20 in the environment. In other embodiments, the functionality of the companion processing module 4 may be integrated in software and hardware components of the display device 2 as in FIG. 1B. Some examples of hardware components of the companion processing module 4 are shown in FIG. 9.

One or more remote, network accessible computer system(s) 12 may be leveraged for processing power and remote data access. An example of hardware components of a computer system 12 is shown in FIG. 9. The scale and number of units may vary considerably for different embodiments of the computer system 12 and the companion processing module 4. An application may be executing on computer system 12 which interacts with or performs processing for an application executing on one or more processors in the see-through, augmented reality display device system 8. For example, a 3D mapping application may be executing on the one or more computer systems 12 and the user's display device system 8. In some embodiments, the application instances may perform in a master and client role in which a client copy is executing on the display device system 8 and performs 3D mapping of its display field of view, receives updates of the 3D mapping from the computer system(s) 12 including updates of objects in its view from the master 3D mapping application and sends image data, and depth and object identification data, if available, back to the master copy.

The display device system 8 may also communicate with one or more other display device systems 8. For example, in some embodiments, the 3D mapping application executing on different display device systems 8 in the same environment share data updates, for example object identifications and occlusion data like an occlusion volume for a real object, in real time in a peer-to-peer configuration between devices.

An example of an environment is a 360 degree visible portion of a real location in which the user is situated. A user may be looking at a subset of his environment which is his field of view. For example, a room is an environment. A person may be in a house and be in the kitchen looking at the top shelf of the refrigerator. The top shelf of the refrigerator is within his display field of view, the kitchen is his environment, but his upstairs bedroom is not part of his current environment as walls and a ceiling block his view of the upstairs bedroom. Of course, as he moves, his environment changes. Some other examples of an environment may be a ball field, a street location, a section of a store, a customer section of a coffee shop and the like. A location can include multiple environments, for example, the house may be a location. The user and his friends may be wearing their display device systems for playing a game which takes place throughout the house. As each player moves about the house, his environment changes. Similarly, a perimeter around several blocks may be a location and different intersections provide different environments to view as different cross streets come into view. In some instances, a location can also be an environment depending on the precision of location tracking sensors or data.

In the illustrated embodiments of FIGS. 1A and 1B, the one or more computer systems 12 and the display device system 8 also have network access to one or more 3D image capture devices 20 which may be, for example, one or more cameras that visually monitor one or more users and the surrounding space such that gestures and movements performed by the one or more users, as well as the structure of the surrounding space including surfaces and objects, may be captured, analyzed, and tracked. Such information may be used for example, to update display positions of virtual objects, displaying location based information to a user, and for identifying gestures to indicate one or more controls or actions for an executing application (e.g. a game application). The image and depth data of the one or more 3D capture devices 20 may supplement data captured by one or more capture devices 113 on the near-eye, AR display device 2 and other such AR display devices 8 in an environment or location for 3D mapping, gesture recognition, object recognition and other functions as discussed further below.

A capture device 20 may be a depth camera positioned in a user environment. According to an example embodiment, each capture device 20 may be configured with RGB and IR components to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight. The depth image may include a two-dimensional (2-D) pixel area of the captured field of view where each pixel in the 2-D pixel area may represent a length in, for example, centimeters, millimeters, or the like of an object in the captured field of view from the camera.

In this embodiment, one or more real controller device(s) 21 is communicatively coupled to the display device system 8 via a wireless connection which may be wired in other examples. The real controller device(s) 21 may also be communicatively coupled to one or more network accessible computer systems 12 for an application being processed by both systems 8 and 12. A real controller device 21 relates one or more physical actions with respect to one or more touch activated parts, e.g. joystick, button, touchscreen, of the controller device to electrical signals which are translated into user input data which is sent to the display device system 8 for controlling an object. A real controller device 21 may also receive a force value from the display device system 8 to be translated by a force feedback mechanism into motion, for example vibration, or another sensation which can be felt by touching the controller device.

FIG. 1B is a block diagram depicting example components of another embodiment of a see-through, augmented, or mixed, reality display device system 8 which may communicate over one or more communication networks 50 with one or more real controller devices 21 as well as one or more network accessible computer systems 12. The display device system 8 may also communicate with one or more 3D image capture devices 20 if available and other display device systems 8 if desired over one or more communication networks 50. In this embodiment, the control circuitry 136 of the display device 2 incorporates the functionality which a companion processing module provides in FIG. 1A and communicates wirelessly via a wireless transceiver (see wireless interface 137 in FIG. 2A) over one or more communication networks 50 to one or more computer systems 12 whether located nearby or at a remote location, one or more real controller devices 21, other display device systems 8 in a location or environment and, if available, a 3D image capture device in the environment 20.

FIG. 2A is a side view of an eyeglass temple 102 of the frame 115 in an embodiment of the optical see-through, augmented reality display device 2 embodied as eyeglasses providing support for hardware and software components. At the front of frame 115 is depicted one of at least two physical environment facing capture devices 113, e.g. cameras, that can capture image data like video and still images, typically in color, of the real world to map real objects in the display field of view of the see-through display, and hence, in the field of view of the user.

In some examples, the capture devices 113 may also be depth sensitive, for example, they may be depth sensitive cameras which transmit and detect infrared light from which depth data may be determined. In other examples, a separate depth sensor (not shown) on the front of the frame 115 may also capture and provide depth data to objects and other surfaces in the field of view. The depth data and image data form a depth map of the captured field of view of the capture devices 113 which are calibrated to include the display field of view. A three dimensional (3D) mapping of the display field of view can be generated based on the depth map. Some examples of depth sensing technologies that may be included on the head mounted display device 2 without limitation, are SONAR, LIDAR, Structured Light, and/or Time of Flight.

In some embodiments, stereopsis is used for determining depth information instead of or in addition to a depth sensor. The outward facing capture devices 113 provide overlapping image data from which depth information for objects in the image data may be determined based on stereopsis. Parallax and contrasting features such as color contrast may be used to resolve a relative position of one real object from another in the captured image data, for example for objects beyond a depth resolution of a depth sensor.

The capture devices 113 are also referred to as outward facing capture devices meaning facing outward from the user's head. The illustrated capture device 113 is a front facing capture device which is calibrated with respect to a reference point of its respective display optical system 14. One example of such a reference point is an optical axis (see optical axis 142 in FIG. 2B) of its respective display optical system 14. The calibration allows the field of view of the display optical systems 14, also referred to as the display field of view, to be determined from the data captured by the capture devices 113.

Control circuitry 136 provide various electronics that support the other components of head mounted display device 2. In this example, the right temple 102r includes control circuitry 136 for the display device 2 which includes a processing unit 210, a memory 244 accessible to the processing unit 210 for storing processor readable instructions and data, a wireless interface 137 communicatively coupled to the processing unit 210, and a power supply 239 providing power for the components of the control circuitry 136 and the other components of the display 2 like the capture devices 113, the microphone 110 and the sensing units discussed below. The processing unit 210 may comprise one or more processors including a central processing unit (CPU) and a graphics processing unit (GPU), particularly in embodiments without a separate companion processing module 4, which contains at least one graphics processing unit (GPU).

Inside, or mounted to temple 102, are an earphone of a set of earphones 130, an inertial sensing unit 132 including one or more inertial sensors, a location sensing unit 144 including one or more location or proximity sensors, some examples of which are a GPS transceiver, an infrared (IR) transceiver, or a radio frequency transceiver for processing RFID data. Optional electrical impulse sensing unit 128 detects commands via eye movements. In one embodiment, inertial sensing unit 132 includes as sensors a three axis magnetometer, a three axis gyro, and a three axis accelerometer. The inertial sensors are for sensing position, orientation, and sudden accelerations of head mounted display device 2. From these movements, head position, and thus orientation of the display device, may also be determined. In this embodiment, each of the devices processing an analog signal in its operation include control circuitry which interfaces digitally with the digital processing unit 210 and memory 244 and which produces or converts analog signals, or both produces and converts analog signals, for its respective device. Some examples of devices which process analog signals are the sensing units 144, 132, 128 and earphones 130 as well as the microphone 110, capture devices 113 and an IR illuminator 134A, and an IR detector or camera 134B discussed below, Mounted to or inside temple 102 is an image source or image generation unit 120 which produces visible light representing images. The image generation unit 120 can display a virtual object to appear at a designated depth location in a field of view to provide a realistic, in-focus three dimensional display of a virtual object and which can interact with one or more real objects. Some examples of embodiments of image generation units 120 which can display virtual objects at various depths are described in the following applications which are hereby incorporated by reference: "Automatic Variable Virtual Focus for Augmented Reality Displays," having U.S. patent application Ser. No. 12/941,825 and inventors Avi Bar-Zeev and John Lewis, and which was filed Nov. 8, 2010 and "Automatic Focus Improvement for Augmented Reality Displays," having U.S. patent application Ser. No. 12/949,650 and inventors Avi Bar-Zeev and John Lewis, and which was filed Nov. 18, 2010. In these examples, a focal length for an image generated by the microdisplay is changed by adjusting a displacement between an image source such as a microdisplay and at least one optical element like a lens or by adjusting the optical power of an optical element which receives the light representing the image. The change in focal length results in a change in a region of the field of view of the display device in which the image of the virtual object appears to be displayed. In one example, multiple images, each including a virtual object, may be displayed to the user at a rate rapid enough so human temporal image fusion makes the images appear to be present at once to human eyes. In another example, a composite image of the in-focus portions of the virtual images generated at the different focal regions is displayed.

In one embodiment, the image generation unit 120 includes a microdisplay for projecting images of one or more virtual objects and coupling optics like a lens system for directing images from the microdisplay to a reflecting surface or element 124. The microdisplay may be implemented in various technologies including transmissive projection technology, micro organic light emitting diode (OLED) technology, or a reflective technology like digital light processing (DLP), liquid crystal on silicon (LCOS) and Mirasol® display technology from Qualcomm, Inc. The reflecting surface 124 directs the light from the image generation unit 120 into a light guide optical element 112, which directs the light representing the image into the user's eye.

FIG. 2B is a top view of an embodiment of one side of an optical see-through, near-eye, augmented reality display device including a display optical system 14. A portion of the frame 115 of the near-eye display device 2 will surround a display optical system 14 for providing support and making electrical connections. In order to show the components of the display optical system 14, in this case 14r for the right eye system, in the head mounted display device 2, a portion of the frame 115 surrounding the display optical system is not depicted.

In the illustrated embodiment, the display optical system 14 is an integrated eye tracking and display system. The system embodiment includes an opacity filter 114 for enhancing contrast of virtual imagery, which is behind and aligned with optional see-through lens 116 in this example, light guide optical element 112 for projecting image data from the image generation unit 120 is behind and aligned with opacity filter 114, and optional see-through lens 118 is behind and aligned with light guide optical element 112.

Light guide optical element 112 transmits light from image generation unit 120 to the eye 140 of the user wearing head mounted, display device 2. Light guide optical element 112 also allows light from in front of the head mounted, display device 2 to be transmitted through light guide optical element 112 to eye 140, as depicted by an arrow representing an optical axis 142 of the display optical system 14r, thereby allowing the user to have an actual direct view of the space in front of head mounted, display device 2 in addition to receiving a virtual image from image generation unit 120. Thus, the walls of light guide optical element 112 are see-through. Light guide optical element 112 is a planar waveguide in this embodiment. A representative reflecting element 134E represents the one or more optical elements like mirrors, gratings, and other optical elements which direct visible light representing an image from the planar waveguide towards the user eye 140.

Infrared illumination and reflections also traverse the planar waveguide for an eye tracking system 134 for tracking the position and movement of the user's eye, typically the user's pupil. Eye movements may also include blinks. The tracked eye data may be used for applications such as gaze detection, blink command detection and gathering biometric information indicating a personal state of being for the user. The eye tracking system 134 comprises an eye tracking IR illumination source 134A (an infrared light emitting diode (LED) or a laser (e.g. VCSEL)) an eye tracking IR sensor 134B (e.g. IR camera, arrangement of IR photodetectors, or an IR position sensitive detector (PSD) for tracking glint positions), wavelength selective filters 123 and 125, and the representative reflecting element 126. In this embodiment, representative reflecting element 134E also implements bidirectional infrared (IR) filtering which directs IR illumination towards the eye 140, preferably centered about the optical axis 142 and receives IR reflections from the user eye 140. In some examples, as part of an integrated eye tracking and display system, reflecting element 134E may include a hot mirror or gratings for implementing the bidirectional IR filtering. A wavelength selective filter 134C passes through visible spectrum light from the reflecting surface 124 and directs the infrared wavelength illumination from the eye tracking illumination source 134A into the planar waveguide. Wavelength selective filter 134D passes the visible light and the infrared illumination in an optical path direction heading towards the nose bridge 104. Wavelength selective filter 134D directs infrared radiation from the waveguide including infrared reflections of the user eye 140, preferably including reflections captured about the optical axis 142, out of the light guide optical element 112 embodied as a waveguide to the IR sensor 134B.

In other embodiments, the eye tracking unit optics are not integrated with the display optics. For more examples of eye tracking systems for HMD devices, see U.S. Pat. No. 7,401,920, entitled "Head Mounted Eye Tracking and Display System", issued Jul. 22, 2008 to Kranz et al., see U.S. patent application Ser. No. 13/221,739, Lewis et al., entitled "Gaze Detection in a See-Through, Near-Eye, Mixed Reality Display," filed Aug. 30, 2011, and see U.S. patent application Ser. No. 13/245,700, Bohn, entitled "Integrated Eye Tracking and Display System," filed Sep. 26, 2011, all of which are incorporated herein by reference.

Another embodiment for tracking the direction of the eyes is based on charge tracking. This concept is based on the observation that a retina carries a measurable positive charge and the cornea has a negative charge. Sensors in sensing unit 128, in some embodiments, are mounted by the user's ears (near earphones 130) to detect the electrical potential while the eyes move around and effectively read out what the eyes are doing in real time. (See *Control your mobile music with eyeball-activated earphones*!, Feb. 19, 2010, http://www.wirefresh.com/control-your-mobile-music-with-eyeball-actvated-headphones, which is hereby incorporated by reference.) Eye blinks may be tracked as commands. Other embodiments for tracking eye movements such as blinks which are based on pattern and motion recognition in image data from a small eye tracking camera 134B can also be used. The eye tracking camera 134B sends buffers of image data to the memory 244 under control of the control circuitry 136.

Opacity filter 114, which is aligned with light guide optical element 112, selectively blocks natural light from passing through light guide optical element 112 for enhancing contrast of virtual imagery. The opacity filter may also be used for occlusion processing. In this embodiment, electrical control circuitry for the opacity filter, not shown, receives instructions from the control circuitry 136 via electrical connections routed through the frame. More details of an opacity filter are provided in U.S. patent application Ser. No. 12/887,426, "Opacity Filter For See-Through Mounted Display," filed on Sep. 21, 2010, incorporated herein by reference in its entirety.

Again, FIGS. 2A and 2B only show half of the head mounted display device 2. A full head mounted display device would include another set of optional see-through lenses 116 and 118, another opacity filter 114, another light guide optical element 112, another image generation unit 120, physical environment facing capture device 113 (also referred to as outward facing or front facing capture device 113), eye tracking system 134, earphone 130, and sensing unit 128 if present. Additional details of a head mounted display device system are illustrated in U.S. patent application Ser. No. 12/905,952 entitled Fusing Virtual Content Into Real Content, Filed Oct. 15, 2010, fully incorporated herein by reference.

FIG. 2C is a block diagram of an embodiment of a real controller device. In this embodiment, a real controller device 21 comprises a computer control unit 24 including a processing unit 26 including at least one of a microcontroller or a central processing unit, a memory 28 including real controller device interface software 189 for interfacing with a computer system executing an application for which the real controller device 21 provides input and force feedback, and one or more communication interfaces 35 (e.g. WUSB, IR, Bluetooth, WiFi, 4G, wireless Ethernet or other computer network based protocols) for communicating with a computer system such as a near-eye, augmented reality display device system 8. In some embodiments, the communications interfaces 35 include a wired communication interface as well.

The computer control unit 24 receives digital data representing user input from a touch activated control mechanism interface 44 which controls a touch activated control mechanism 46. The mechanism 46 may be for example a motorized joystick or buttons which when manipulated cause one or more electrical signals to be generated which the interface 44 interprets as one or more user commands, which are typically predefined by an application being supported by the real controller device. The touch activated control mechanism interface 44 may be an electro-mechanical interface in some examples. In other examples, the interface 44 may be an electrochemical interface, for example for use with certain types of touchscreens which may be used as the touch activated control mechanism 46.

The computer control unit 24 may also send a digital signal representing a force value to a force feedback mechanism interface 40 which controls one or more touchable components making up a touch based force feedback mechanism 48. Some examples of a touchable component which may be used to represent a force are a casing of the controller device or the touch activated control mechanism 46 of the device 21 and motors which cause a sensation, an example of which is vibration. In some examples, the sensation has a direction representing a direction from which the force is felt. A torque may be generated by a motor for representing the direction.

FIGS. 3A through 3F illustrate contextual examples of controlling a virtual object with a real controller device in which the user commands from the real controller device are interpreted, applied and display based on the view or perspective of the object in the near-eye AR display. A perspective is where a user is looking from, and a display field of view is what a user sees from the perspective. The term user perspective includes approximations of a user perspective with varying degrees of accuracy. For example, the user perspective may be determined using parameters without regard to specific eye data for a specific user. In other examples, more sophisticated techniques may use individual gaze and eye tracking data to more precisely pinpoint from where a user is looking.

In some embodiments, a user perspective of the virtual object is determined from a position and orientation of the object in the display field of view. The display field of view can be defined in terms of a view dependent coordinate system. The view dependent coordinate system moves with the display as the user's head moves. (In contrast, a 3D mapping of an environment using a view independent coordinate system has a fixed origin in the environment.) In one example, the view dependent coordinate system is an orthogonal X, Y, Z system which has a depth axis extending from the display device so the display field of view represents what is in front of the user's eyes so the display field of view is what is identified by the display device system 8 as being that which is seen from the user perspective.

In some examples, virtual objects are tracked in the display field of view and real objects are ignored. Data such as from the inertial sensing unit 132 may identify position changes of the head mounted display device 2, and hence, the user's eyes and perspective. For example, the inertial sensing unit 132 may identify rotation of the user's eyes and therefore rotation of the user's perspective of the virtual object. The display of the virtual object is updated so as to be seen in accordance with the updated user perspective. In other examples, the virtual object is part of an augmented reality experience and is registered to or interacts with one or more real objects under control of an application which controls it. The positions of both real and virtual objects are tracked in the display field of view. The positions of real objects may be tracked based on captured image data, depth data, or both.

In some embodiments, the front facing capture devices 113 capture and provide image and depth data from which real objects are identified as well as their positions and often orientations relative to the display portion of the device. Many objects have distinct sides with respect to a center of mass, a center of volume or some other fixed reference point of the object. For example, using a fixed reference point for a chair, object recognition software on the display device system 8 or executing for it can identify from image data a front side of a chair, a back, a right side and a left side. The determination of an orientation for some objects, for example a basketball, may not be apparent from image data. A virtual object is generated by an application and is displayed at a position and orientation in the view dependent coordinate system as the user would see it if it were a real object. The position of at least one point on the object in terms of the view dependent coordinate system along with object properties information like size and shape of the object identify its positional volume and often orientation relative to one or more reference points (e.g. optical axes) on the display portion of the display device. In some instances, positions of the user's foveae may be approximated in reference to the one or more reference points.

In other words, both real and virtual objects are displayed in the display field of view as they are seen from the user perspective. Therefore, commands indicating movement in a certain direction and interpreting that direction from the view dependent coordinate system of the display field of view results in requested actions indicated by real controller device commands being applied and displayed from the user perspective.

Figure 3A:
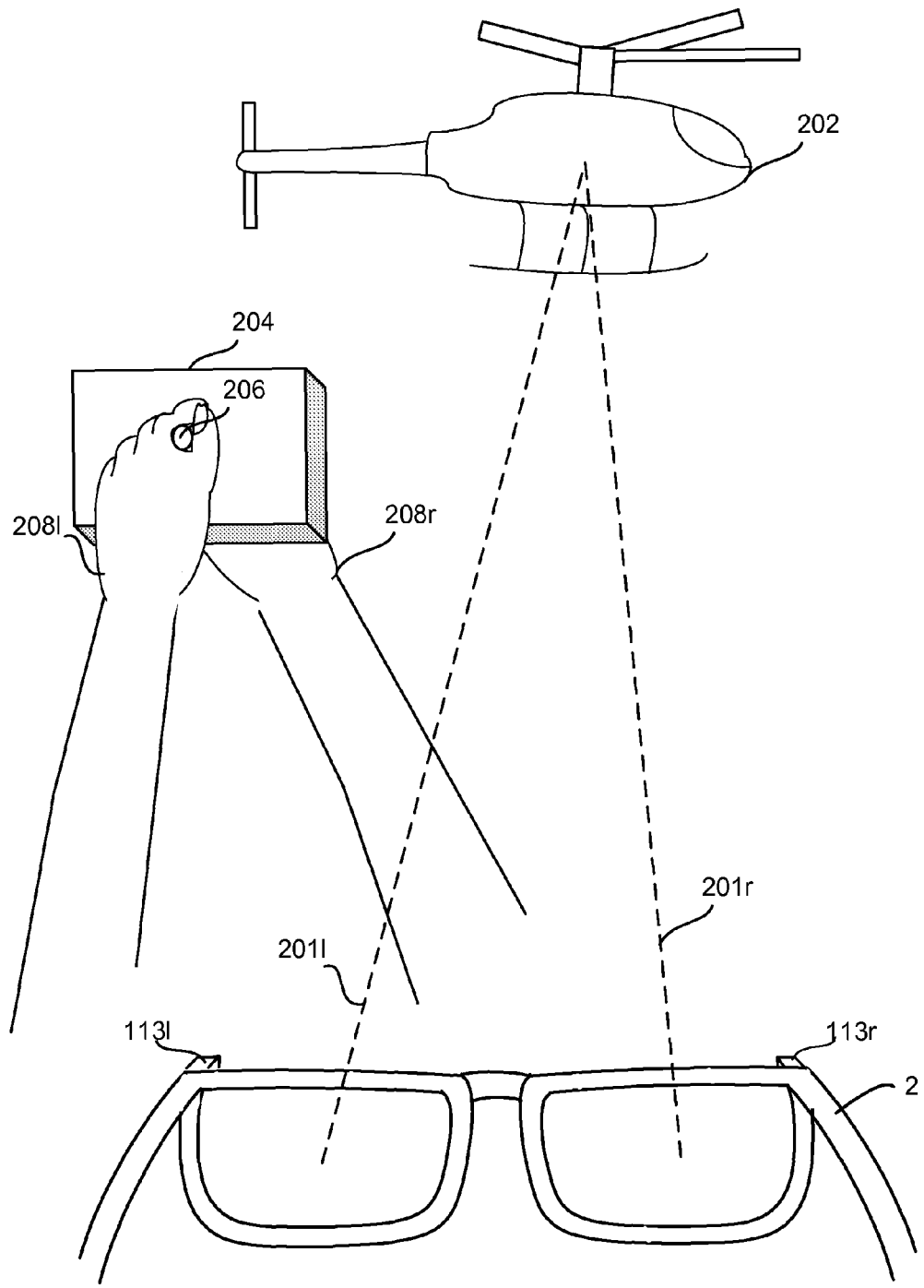
FIGS. 3A and 3B illustrate a contextual example of a virtual object being controlled with a real controller device from a user perspective.
Figure 3B:
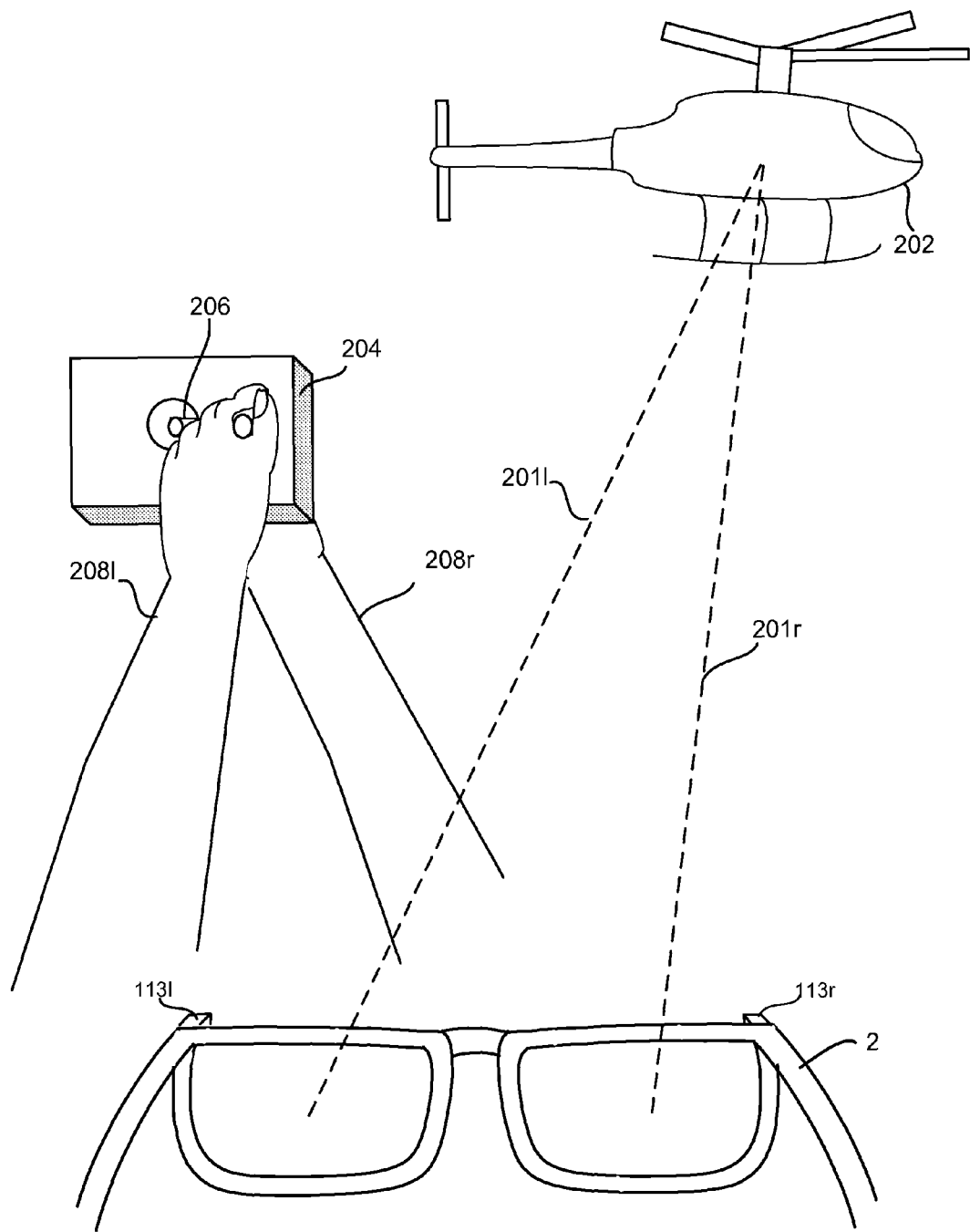

FIGS. 3A and 3B illustrate a contextual example of a virtual object being controlled with a real controller device from a user perspective. In FIG. 3A, a virtual remote control helicopter 202 is a current object of focus in a display field of view being viewed through a near-eye, augmented reality display device 2, here embodied in a pair of eyeglasses. Lines 201l and 201r are gaze lines showing at their intersection that the user is focused on the center of the payload section on the right side of the helicopter. Based on eye tracking data from the eye tracking system 134 and a 3D mapping of the display field of view, this point of gaze is determined by one or more processors of the display device system 8.

In one example of determining gaze, the eye tracking software executing on the one or more processors identifies a pupil position within each eye and models a gaze line for each eye extending from an approximated location of a respective fovea. The one or more processors determine a position in the display field of view where the gaze lines meet. This intersection is the point of gaze and it is within the Panum's fusional area for human eyes which is the area in which objects are in focus. Based on a 3D mapping of objects in the display field of view (see discussion of scene mapping engine in FIG. 4A), an object at which the gaze lines meet is an object of focus.

The user's right hand 208r supports a hand-held real controller device 204 having a joystick 206 which the user's left hand 208l manipulates to control the helicopter 202. In this FIG. 3A, the joystick is in a central position. In FIG. 3B, the user's left hand 208l has moved the joystick 206 to the right. The helicopter 202 is displayed as moving to the right in the display field of view. The real controller device 204 input data indicating an action request of moving to the right is applied from the user perspective of the helicopter in that the front of the helicopter moves right in the display. For example, if the input data from the controller were not being applied from the user perspective but from the perspective of a helicopter pilot, the helicopter would move to its right and appear to be turning towards the user. When the user commands are applied and the requested action is displayed from the user perspective, the user control is more fluid as the user does not have to determine how to apply commands as if sitting in the helicopter.

Figure 3C:
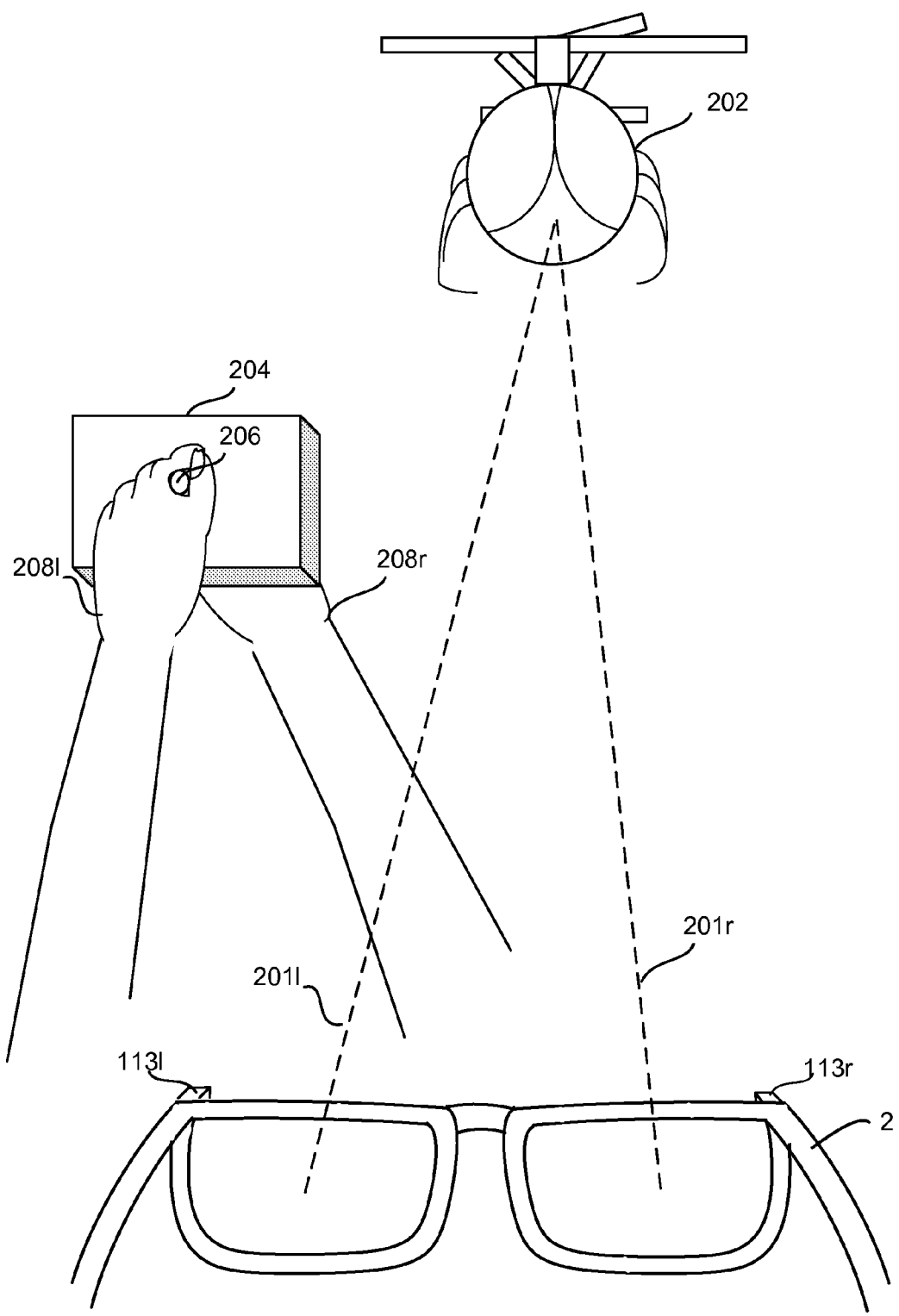
FIGS. 3C and 3D illustrate another contextual example of a virtual object being controlled with a real controller device from a user perspective.
Figure 3D:
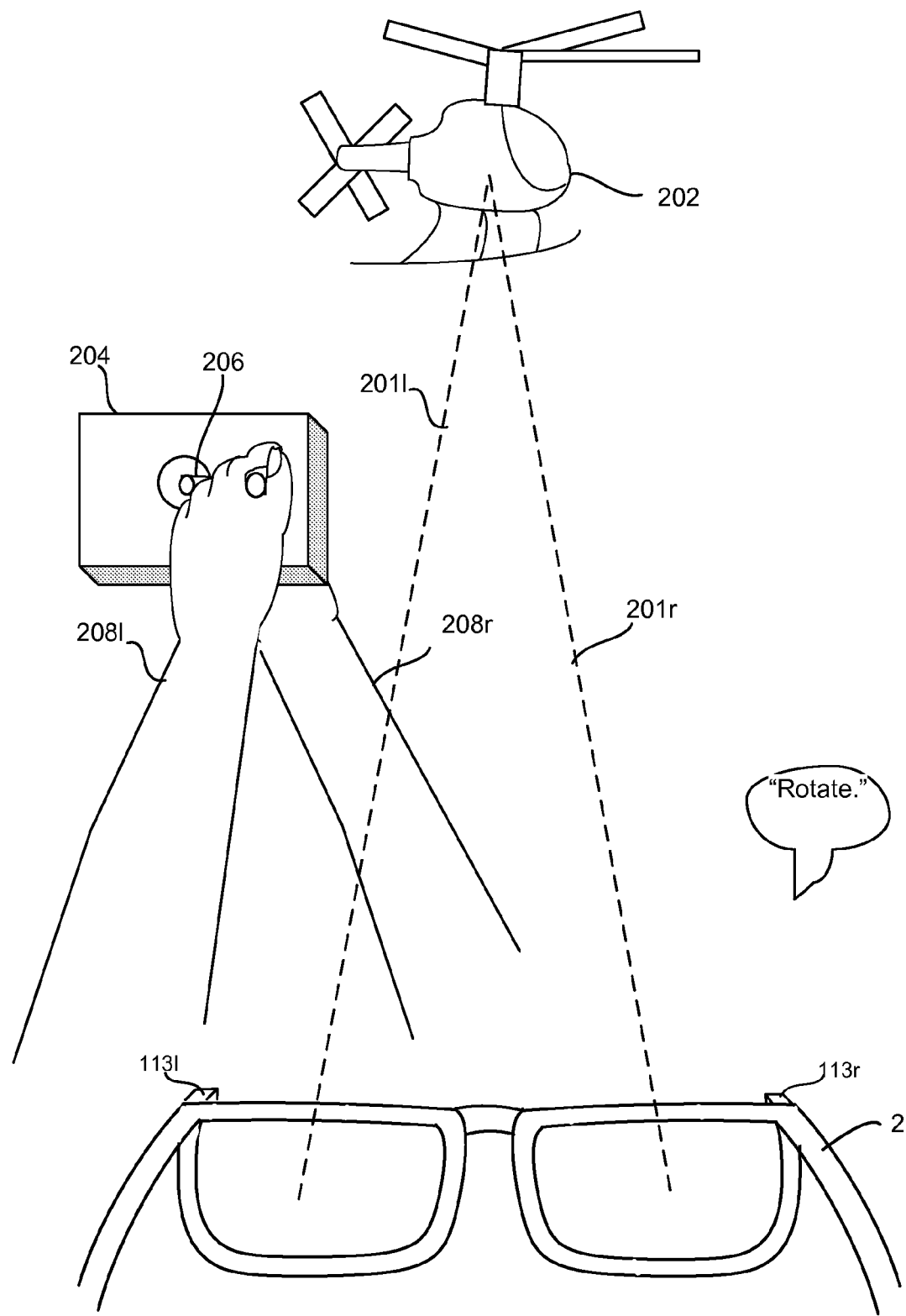

FIGS. 3C and 3D illustrate another contextual example of a virtual object being controlled with a real controller device from a user perspective. In FIG. 3C, the user may have walked around to the front of the virtual helicopter 202 or has via manipulation of the real controller device rotated the helicopter front to his or her user perspective from FIG. 3B. The real controller user input may be augmented with a user physical action command of a part of a user's body. In the example of FIG. 3D, a voice command from the user's mouth of "rotate" detected by microphone 110 and interpreted by one or more processors of the system 8 in conjunction with the user's pushing of the joystick 206 to the right causes the front of the helicopter to rotate to its left which is to the right of the display device.

Figure 3E:
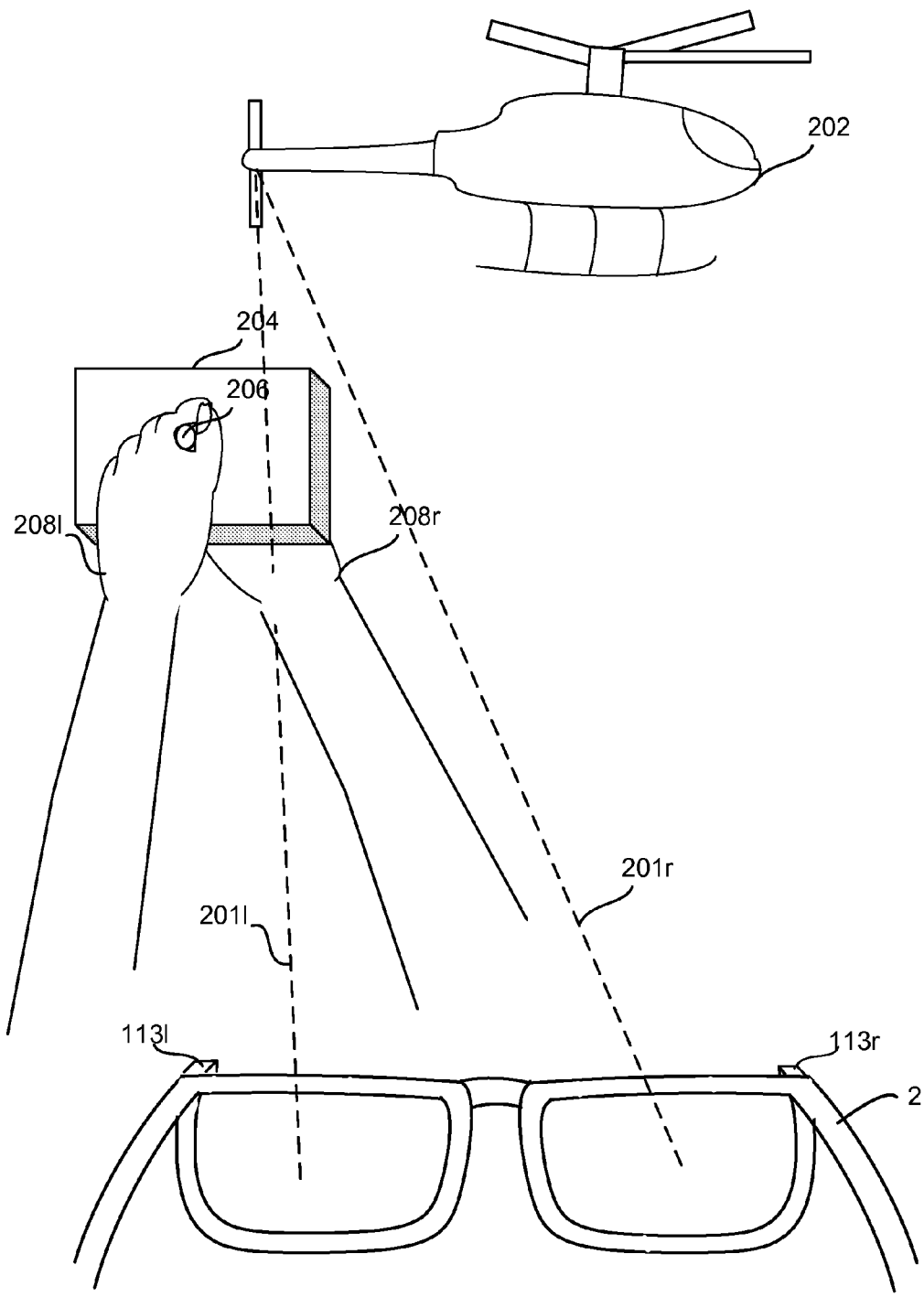
FIGS. 3E and 3F illustrate yet another contextual example of a portion of a virtual object being controlled with a real controller device from a user perspective.
Figure 3F:
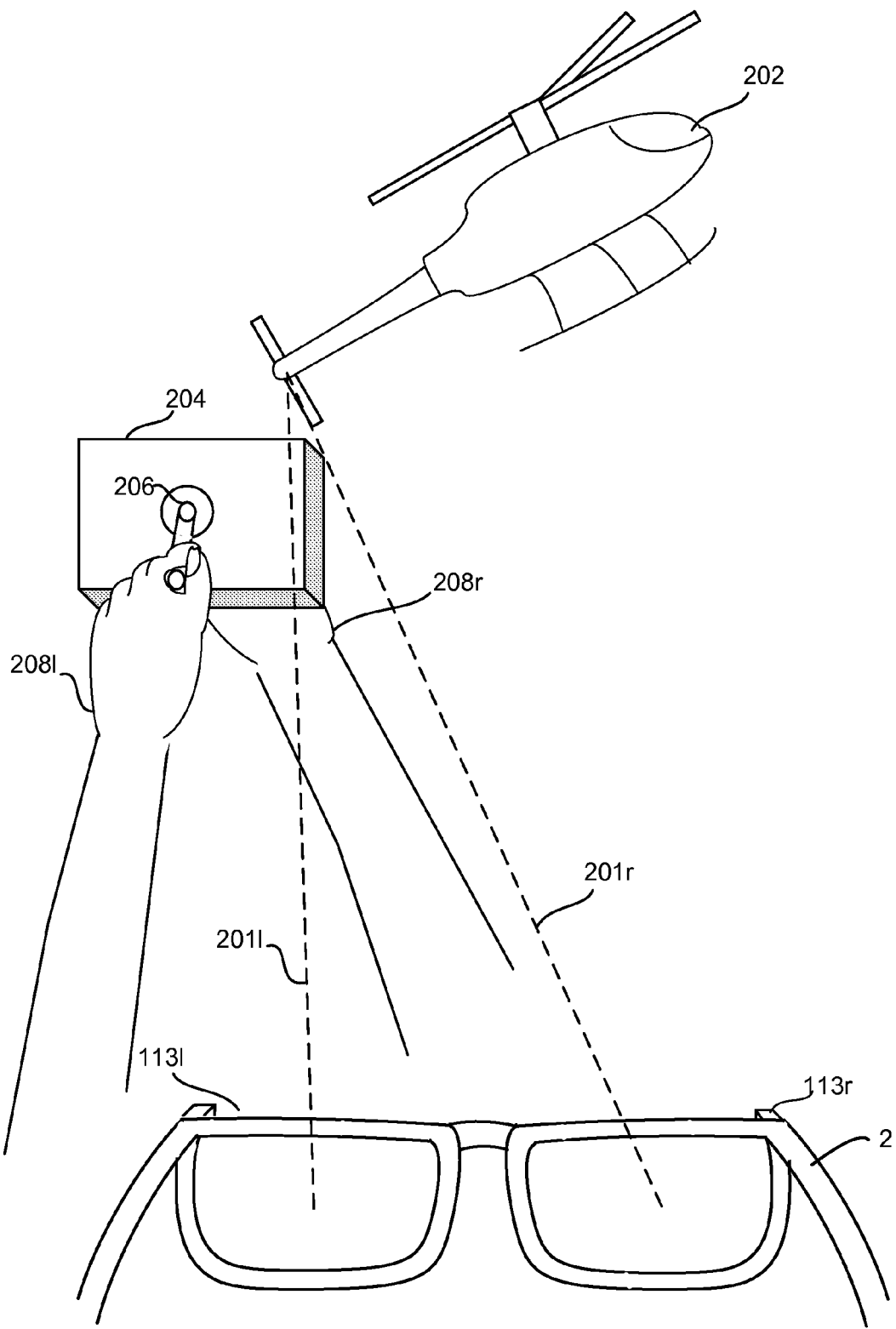

FIGS. 3E and 3F illustrate yet another contextual example of a portion of a virtual object being controlled with a real controller device from a user perspective. FIG. 3E is like FIG. 3A except that the point of gaze is now the tail rotors of the helicopter. User physical action such as gaze duration at a portion of the object, an eye blinking command combined with gaze, a gesture, or a voice command may be used to select a portion of an object. In FIG. 3F, the user has pulled the joystick 206 down causing the display to show the tail rotors going down and the pulling effect this has on the rest of the helicopter. In other examples, a user may be able to indicate one or more parts of an object, like an arm of an avatar or the rear wheels of a car, is to move separately or in a different direction from the rest of the object.

Figure 4A:
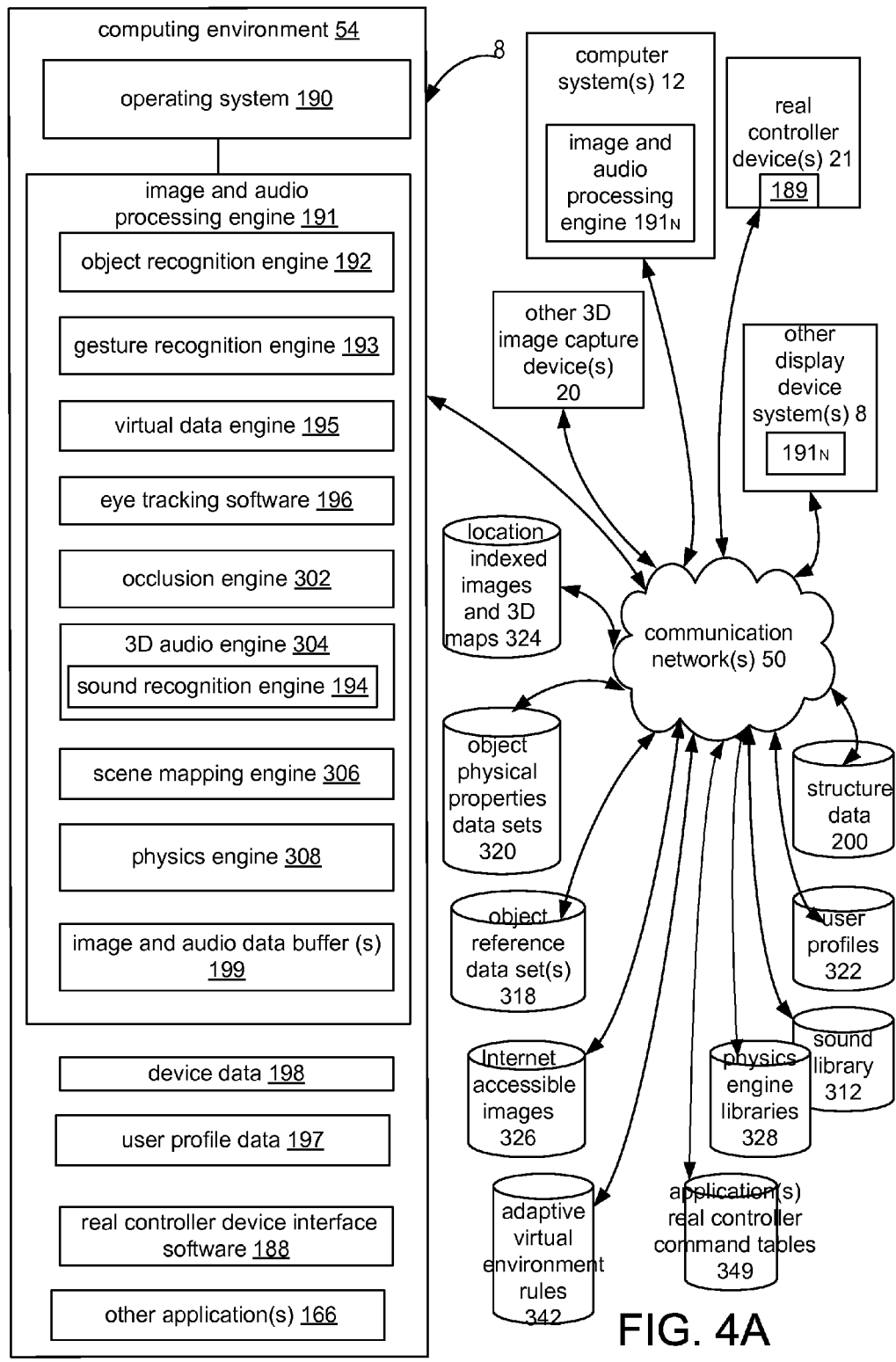
FIG. 4A is a block diagram of an embodiment of a system from a software perspective for controlling a virtual object displayed by an augmented reality display device system.

FIG. 4A is a block diagram of an embodiment of a system from a software perspective for controlling a virtual object displayed by an augmented reality display device system, an example of which is a near-eye, see-through display device system. FIG. 4A illustrates a computing environment embodiment 54 from a software perspective which may be implemented by a system like display device system 8, one or more remote computer systems 12 in communication with one or more display device systems or a combination of these. Additionally, display device systems can communicate with other display device systems for sharing data and processing resources. Network connectivity allows leveraging of available computing resources. As shown in the embodiment of FIG. 4A, the software components of a computing environment 54 comprise an image and audio processing engine 191 in communication with an operating system 190. Image and audio processing engine 191 processes image data (e.g. moving data like video or still), and audio data in order to support applications executing for a head mounted display (HMD) device system like a see-through, augmented reality display device system 8. Image and audio processing engine 191 includes object recognition engine 192, gesture recognition engine 193, virtual data engine 195, eye tracking software 196 if eye tracking is in use, an occlusion engine 302, a 3D positional audio engine 304 with a sound recognition engine 194, a scene mapping engine 306, and a physics engine 308 which may communicate with each other.

The computing environment 54 also stores data in image and audio data buffer(s) 199. The buffers provide memory for receiving image data captured from the outward facing capture devices 113, image data captured by other capture devices if available, image data from an eye tracking camera of an eye tracking system 134 if used, buffers for holding image data of virtual objects to be displayed by the image generation units 120, and buffers for both input and output audio data like sounds captured from the user via microphone 110 and sound effects for an application from the 3D audio engine 304 to be output to the user via earphones 130.

Image and audio processing engine 191 processes image data, depth data and audio data received from one or more capture devices which may be available in a location. Image and depth information may come from the outward facing capture devices 113 captured as the user moves his head or body and additionally based on captured data from other display device systems 8 and other image data captured of the location such as stored image data and maps 324 or provided by other 3D image capture devices 20 in the location, e.g. capture devices 20A and 20B in FIG. 8A.

The individual engines and data stores depicted in FIG. 4A are described in more detail below, but first an overview of the data and functions they provide as a supporting platform from the perspective of an application 166 is described. An application 166 executing in the near-eye, augmented reality display device system 8 or executing remotely on a computer system 12 for the display device system 8 leverages the various engines of the image and audio processing engine 191 for implementing its one or more functions by sending requests identifying data for processing and receiving notification of data updates. For example, notifications from the scene mapping engine 306 identify the positions of virtual and real objects at least in the display field of view. The application 166 identifies data to the virtual data engine 195 for generating the structure and physical properties of an object for display. The application 166 may supply and identify a physics model for each virtual object generated for its application to the physics engine 308, or the physics engine 308 may generate a physics model based on the object physical properties data set $320_N$ for the object.

The operating system 190 makes available to applications 166 which gestures the gesture recognition engine 193 has identified, which words or sounds the sound recognition engine 194 has identified, the positions of objects from the scene mapping engine 306 as described above, and eye data such as a position of a pupil or an eye movement like a blink sequence detected from the eye tracking software 196. A sound to be played for the user in accordance with the application 166 can be uploaded to a sound library 312 and identified to the 3D audio engine 304 with data identifying from which direction or position to make the sound seem to come from. The device data 198 makes available to the application 166 location data, head position data, data identifying an orientation with respect to the ground and other data from sensing units of the display device 2.

The scene mapping engine 306 is first described. A 3D mapping of the display field of view of the augmented reality display can be determined by the scene mapping engine 306 based on captured image data and depth data, either derived from the captured image data or captured as well, for the display field of view. The 3D mapping includes 3D space positions or position volumes for objects. A 3D space is a volume of space occupied by the object. Depending on the precision desired, the 3D space can match the 3D shape of the object or be a less precise volume like a bounding shape like a bounding box or bounding ellipse around an object. A 3D space position represents position coordinates for the perimeter of the volume or 3D space. In other words the 3D space position identifies how much space an object occupies and where in the display field of view that occupied space is.

A depth map can represent the captured image data and depth data. A view dependent coordinate system may be used for the mapping of the display field of view as how an object appears to a user depends on the user's point of view, also known as the user's perspective. An example of a view dependent coordinate system is an x, y, z coordinate system in which the z-axis or depth axis extends orthogonally or as a normal from the front of the see-through display. In some examples, the image and depth data for the depth map representing the display field of view is received from the capture devices 113 on the front of the display device 2. The display field of view may also be determined remotely or using a combination of remote (e.g. 12 or another display device system 8) and local processing.

Mapping what is around the user in the user's environment can be aided with sensor data. Data from an orientation sensing unit 132, e.g. a three axis accelerometer and a three axis magnetometer, determines position changes of the user's head and correlation of those head position changes with changes in the image and depth data from the front facing capture devices 113 can identify positions of objects relative to one another and at what subset of an environment a user is looking. As mentioned above, depth map data of another HMD device, currently or previously in the environment, along with position and head orientation data for this other HMD device can also be used to map what is in the user environment. Shared real objects in their depth maps can be used for image alignment and other techniques for image mapping. With the position and orientation data as well, what objects are coming into view can be predicted as well so physical interaction processing, occlusion and other processing can start even before the objects are in view.

The scene mapping engine 306 can also use a view independent coordinate system for 3D mapping. The map can be stored in the view independent coordinate system in a storage location (e.g. 324) accessible as well by other display device systems 8, other computer systems 12 or both, be retrieved from memory and be updated over time as one or more users enter or re-enter the environment. In some examples, image and object registration into a common coordinate system may be performed using an extrinsic calibration process. The registration and alignment of images (or objects within the images) onto a common coordinate system allows the scene mapping engine to be able to compare and integrate real-world objects, landmarks, or other features extracted from the different images into a unified 3-D map associated with the real-world environment.

When a user enters an environment, the scene mapping engine 306 may first search for a pre-generated 3D map identifying 3D space positions and identification data of objects stored locally or accessible from another display device system 8 or a network accessible computer system 12. The map may include stationary objects. The map may also include objects moving in real time and current light and shadow conditions if the map is presently being updated by another system. For example, a pre-generated map indicating positions, identification data and physical properties of stationary objects in a user's living room derived from image and depth data from previous HMD sessions can be retrieved from memory. Additionally, identification data including physical properties for objects which tend to enter the location can be preloaded for faster recognition. A pre-generated map may also store physics models for objects as discussed below. A pre-generated map may be stored in a network accessible database like image and map database(s) 324.

The environment may be identified by location data which may be used as an index to search in location indexed image and pre-generated 3D map databases 324 or in Internet accessible images 326 for a map or image related data which may be used to generate a map. For example, location data such as GPS data from a GPS transceiver of the location sensing unit 144 on the display device 2 may identify the location of the user. Additionally, an IP address of a WiFi hotspot or cellular station to which the display device system 8 has a connection can identify a location. Cameras at known positions within a location may identify the user and other people through facial recognition. Additionally, identifier tokens may be exchanged between display device systems 8 via infra-red, Bluetooth or WUSB. The range of the infra-red, WUSB or Bluetooth signal can act as a predefined distance for determining proximity of another user. Maps and map updates, or at least object identification data may be exchanged between display device systems via infra-red, Bluetooth or WUSB as the range of the signal allows.

An example of image related data which may be used to generate a map is meta data associated with any matched image data, from which objects and their positions within a coordinate system for the environment can be identified. For example, a relative position of one or more objects in image data from the outward facing capture devices 113 of the user's display device system 8 can be determined with respect to one or more GPS tracked objects in the location from which other relative positions of real and virtual objects can be identified.

As described in the discussion of FIGS. 1A and 1B, image data for mapping an environment can come from capture devices other than those capture devices 113 on the user's display device 2. Image and depth data from multiple perspectives can be received in real time from other 3D image capture devices 20 under control of one or more network accessible computer systems 12 or from at least one other display device system 8 in the environment. Depth images from multiple perspectives may be combined based on a view independent coordinate system for describing an environment (e.g. an x, y, z representation of a room, a store space, or a geofenced area) for creating the volumetric or 3D mapping. For example, if the scene mapping engine 306 receives depth images from multiple cameras, the engine 306 correlates the images to have a common coordinate system by lining up the images and uses depth data to create the volumetric description of the environment. The scene mapping engine 306 identifies the position and tracks the movement of real and virtual objects in the volumetric space based on communications with the object recognition engine 192 of the image and audio processing engine 191 and one or more executing applications 166 generating virtual objects. The scene mapping engine 306 may be in communication with other scene mapping engines 306 executing in other systems (e.g. 12 and 8).

In some instances, a scene mapping engine 306 on a network accessible computer system 12 receives image data of multiple display fields of view from multiple see-through augmented reality display device systems 8 in an environment and correlates their image data based on capture times for the data in order to track changes of objects and lighting and shadow in the environment in real time. 3D map updates can then be sent to the multiple display device systems 8 in the environment. (For more information on collaborative scene mapping between HMDs like system 8 and hub computer systems 12 with access to image data, see "Low-Latency Fusing of Virtual and Real Content," having U.S. patent application Ser. No. 12/912,937 having inventors Avi Bar-Zeev et al. and filed Oct. 27, 2010 and which is hereby incorporated by reference.)

In some examples, a 3D mapping, whether it be a depth map generated by front facing capture devices 113 including a display field of view, a 3D mapping of an environment or a location in a view independent coordinate system, or somewhere in between, may be modeled as a 3D mesh of an environment. A mesh may comprise a detailed geometric representation of various features including real and virtual objects and surfaces thereof within a particular environment or region of an environment. A 3D point cloud representing the surfaces of objects including things like walls and floors in a space can be generated based on captured image data and depth data of the user environment. A 3D mesh of the surfaces in the environment can then be generated from the point cloud. More information regarding the generation of 3-D maps can be found in U.S. patent application Ser. No. 13/017,690, "Three-Dimensional Environment Reconstruction," incorporated herein by reference in its entirety. 3D mesh representations of virtual objects can be added.

The object recognition engine 192 of the image and audio processing engine 191 detects, tracks and identifies real objects in the display field of view and the 3D environment of the user based on captured image data and depth data if available or determined depth positions from stereopsis. The object recognition engine 192 distinguishes real objects from each other by marking object boundaries and comparing the object boundaries with structural data. One example of marking object boundaries is detecting edges within detected or derived depth data and image data and connecting the edges. The object boundary data is then compared with stored structure data in order to identify a type of object within a probability criteria. Besides identifying the type of object, an orientation of an identified object may be detected based on the comparison with the stored structure data 200, object reference data sets 318 or both. A polygon mesh may also be used to represent the object's boundary as mentioned above. One or more databases of structure data 200 accessible over one or more communication networks 50 may include structural information about objects. As in other image processing applications, a person can be a type of object, so an example of structure data is a stored skeletal model of a human which may be referenced to help recognize body parts. Structure data 200 may also include structural information regarding one or more inanimate objects in order to help recognize the one or more inanimate objects, some examples of which are furniture, sporting equipment, automobiles and the like.

The structure data 200 may store structural information as image data or use image data as references for pattern recognition. The image data may also be used for facial recognition. The object recognition engine 192 may also perform facial and pattern recognition on image data of the objects based on stored image data from other sources as well like user profile data 197 of the user, other users profile data 322 accessible by a hub, location indexed images and 3D maps 324 and Internet accessible images 326. Motion capture data from image and depth data may also identify motion characteristics of an object. The object recognition engine 192 may also check detected properties of an object against reference properties of an object like its size, shape and motion characteristics. An example of such a set of reference properties for an object is an object reference data set as stored in objects reference data sets 318.

Figure 4B:
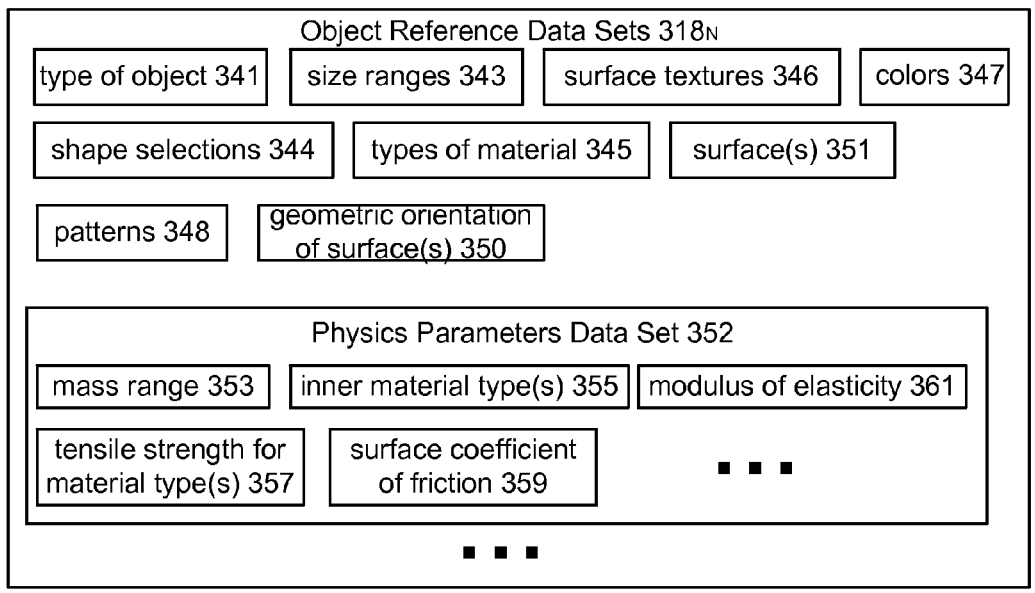
FIG. 4B illustrates an example of an object reference data set.

FIG. 4B illustrates an example of an object reference data set $318_N$ with some examples of data fields which the data set may include. The object reference data sets 318 available to the object recognition engine 192 may have been predetermined manually offline by an application developer or by pattern recognition software and stored. Additionally, if a user inventorizes an object by viewing it with the display device system 8 and inputting data for the data fields, an object reference data set is generated. Also, object reference data sets can be created and stored for sharing with other users as indicated in share permissions. Furthermore, the object recognition engine 192 can search accessible user profile data 197, 322 for information on objects in an environment. An example of such information is purchase data with product identifiers which can then be searched by the object recognition engine 192 in order to locate product descriptions with more details, for example in online catalog entries and product sites. The image data of the object may also be a basis for image searching for more descriptive data as may be found in metadata to fill in the data fields. This allows for more detailed object reference data sets 318.

Particularly, for an object recognition engine executing on one or more hub computer systems 12 with access to multiple users profile data 322 and more extensive computing and storage resources, such searching can be done in the background. Over time as the library or database of object reference data sets 318 grows, objects are recognized more quickly. In some embodiments, the object recognition engine 192 can automatically update data for a type of object data set and also automatically create a new data set for a previously unidentified type of object. In some examples implementing automatic update and automatic generation of new data sets, the object recognition engine 192 can display a message to the user or a database manager indicating additional data is available for a type of object or a previously unknown type of object in order to obtain permission before automatically generating the set. Either the user or the database manager can grant permission to update an existing data set or create and store a new one.

The data fields described below are representative examples and are not intended to be all inclusive. Furthermore, there may be a data set for a general type of object, like chair or car, and then data sets for specific types of chairs or cars. For example, a data set may include a base class object of chair and then sub-classes of chaise-lounge, folding chair, etc. with additional data fields for describing additional features specific to the sub-class. The illustrated data fields include a type of object 341 which may be a data record which also includes sub-fields. For the type of object 341, the other data fields provide data records identifying the types of physical properties available for the type of object. The other examples of data records include size ranges 343, shape selections available 344, typical types of material 345, colors available 347, patterns available 348, surface(s) available 351, typical surface texture(s) 346, and a geometric orientation 350 of each available surface 351.

There may also be stored a physics parameters data set 352 for each object reference data set $318_N$. The example physics parameters include a mass range 353 for the type of object 341, one or more inner material type(s) 355, a modulus of elasticity 361 for use with Hooke's Law, one or more tensile strengths associated with one or more material types 357 including at least a surface material type, and a surface coefficient of friction 359 associated with the surface material. Air may be considered a type of inner material. These parameters may be selected for a physics model representing an object for use by a physics engine 308 as discussed below.

Figure 4C:
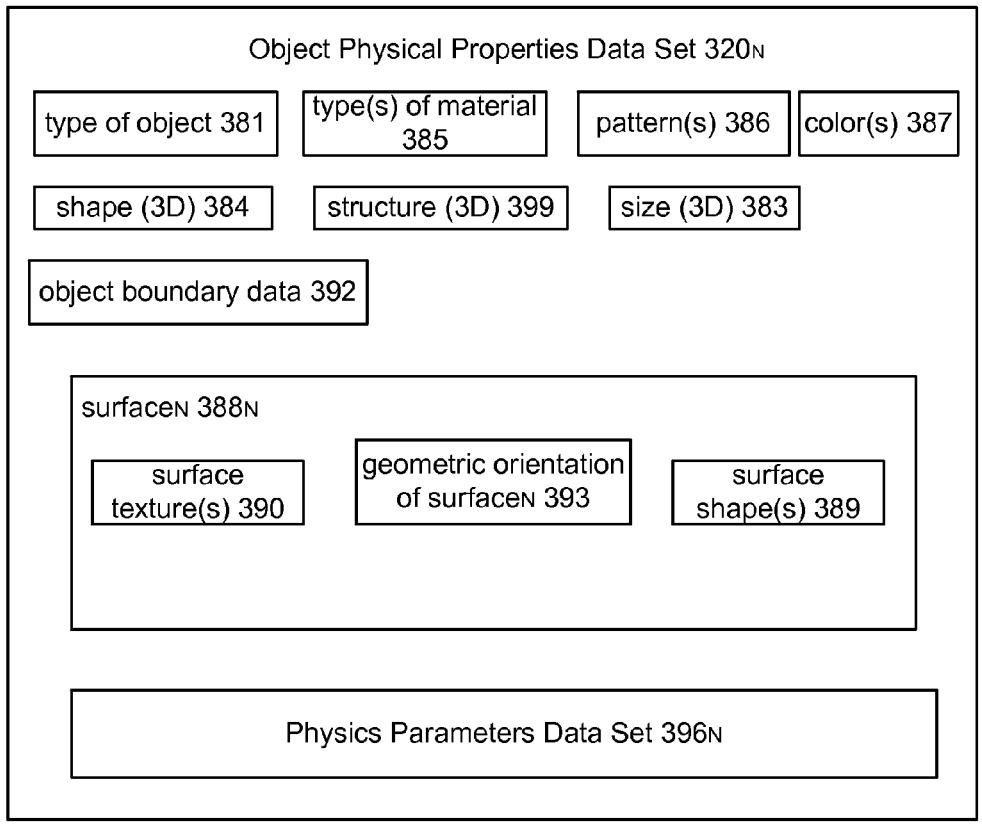
FIG. 4C illustrates some examples of data fields in an object physical properties data set.

FIG. 4C illustrates some examples of data fields in an object physical properties data set $320_N$ stored for an object. For a real object, at least some of the data values for the data fields are determined based on captured image data, depth data or both of the real object. For a virtual object, the data values for the data fields may be data provided by the application which controls the virtual object. The example data fields include a type of object 381, size 383, in three dimensions in this example, shape 384, also 3D in this example, structure 399 (e.g. skeletal or for an inanimate object), also in three dimensions in this example, object boundary data 392, such as for example the determined edge data or a polygon mesh for a real object or the boundary data of a virtual object, and type(s) of material 385. For a real object, a type of surface material may be determined based on captured image data, and the types of inner material determined based on an object reference data set $318_N$ or other object reference data source like 197, 322, 324, and 326. Some other exemplary data fields include pattern(s) 386 and colors 387 as well as surface(s) $388_N$.

Surface $388_N$ represents an exemplary data set for each surface identified. The data set includes one or more surface textures 390, a geometric orientation 393 of the surfaceN, and a surface shape 389 (e.g. flat, round, curvy, uneven, etc.).

For real objects, data is assigned to each of these data fields based on a weighted probability by the object recognition engine 192 as it detects object boundary data and colors and derives shapes and surfaces and looks up object reference data. These different properties are then weighted, and a probability is assigned whether an object in the image data is a certain type of object, and if the probability satisfies a criteria for a certain type of object, that type of object is assigned as the type of object 381 The object physical properties data set $320_N$ is then stored in one or more network accessible data stores 320. A physics parameter data set 396N with data fields like those in the corresponding data set 352, but with values for the specific real or virtual object, is also included in the object physical properties data set $320_N$. These are assigned by an application or the physics engine for virtual objects. For real objects, the physics data fields can be determined from object reference data sources based on the type of object 381 and physical properties determined by the object recognition engine 192.

The scene mapping engine 306 and the object recognition engine 192 exchange data which assist each engine in its functions. For example, based on an object identification and orientation determined by the object recognition engine 192, the scene mapping engine 306 can update a 3D space position or position volume for an object for more accuracy. For example, a chair on its side has a different volume than when it is right side up. A position history or motion path identified from position volumes updated for an object by the scene mapping engine 306 can assist the object recognition engine 192 track an object, particularly when it is being partially occluded.

Upon detection of one or more objects by the object recognition engine 192, image and audio processing engine 191 may report to operating system 190 an identification of each object detected and a corresponding position and orientation which the operating system 190 passes along to other executing applications like the scene mapping engine 306, the occlusion engine 302, the physic engine 308 and other upper level applications 166.

One of the advantages of using a near-eye, augmented reality display device system is the ability to execute an application wherever you are and using your current physical environment as a factor in the execution of a game. Some applications store adaptive virtual environment rules 342 for effecting the placement and display of one or more virtual objects in a 3D mapping of an environment during their execution. For example, a gaming application may receive user input identifying boundaries for a playspace in which virtual objects can be positioned. For example, the user input data may be image and depth data from a capture device on the display device captured while a user is turning his head, gaze data captured while the user is gazing at boundary points and perhaps audio data captured by the microphone of the user speaking a command like "boundary". In other examples, an application automatically determines a playspace or operation space for the application based on a 3D mapping of the user environment or location. A 3D mesh may be used to represent the mapping of the environment. The adaptive virtual environment rules are flexible in that they provide fallback rules or alternative rules based on the real objects and real features mapped in the user environment. An example of a real feature is lighting. Another example is size dimensions.

A user expects a certain quality of experience wherever an application is executed. For example, a degree of difficulty may be associated with a good game experience. For maintaining the degree of difficulty across environments with different features, for example an outdoor area versus a room in a house, the adaptive rules when applied by an application 166 may vary the number and size of virtual objects in the environments with different features. In other examples, the application 166 applying its adaptive rules 342 may vary the type of virtual object based on one or more features of the user environment. The actions a virtual object may perform or a speed of the execution of the actions may be varied. Physics parameters, for example as may be defined in a physics parameters data set 352 may also be varied by the application 166 in accordance with its corresponding adaptive rules 342 depending on the 3D mapping of the environment or application operation space.

The adaptive rules may also effect the appearance of displayed virtual objects for an application based on personal information of the user. The personal information may be stored in user profile data, whether stored locally (197) or in the cloud (322). The personal information may also be detected by the display device system from sensed data. For example, an application may have different versions of a ghost virtual object to be used for different age groups so as to not be too scary for younger children. In another example, a position of a virtual object in the environment may be adjusted based on the user's height so that the virtual object appears in the augmented reality display 14 at eye level. A young child does not have to keep looking up to see the helicopter, and an older user does not have to keep looking down to see the helicopter.

For more information, see U.S. patent application Ser. No. 13/288,350 entitled "Augmented Reality Playspaces with Adaptive Game Rules" Mount et al., and filed Nov. 3, 2011 and which is hereby incorporated by reference.

The occlusion engine 302 identifies spatial occlusions between objects, and in particular between real and virtual objects based on spatial position data for recognized objects within a coordinate system as updated by the objection recognition engine 192 and the scene mapping engine 306. As virtual and real objects have size and shape, a 3D space position for each object may be defined by the scene mapping engine to incorporate the volume occupied by each object. In the case of complete occlusion of a virtual object by a real object, the occlusion engine can notify the virtual data engine to not display the virtual object. In the case of complete occlusion of the real object by the virtual object, the virtual object or its parts can be sized to completely cover the real object and its parts. For partial occlusions, the display is updated to show part of the virtual object and part of the real object. For more information about occlusion processing, see U.S. patent application Ser. No. 12/905,952 entitled "Fusing Virtual Content into Real Content," Flaks et al., and filed Oct. 15, 2010, which is hereby incorporated by reference and see also U.S. patent application Ser. No. 13/443,368 entitled "Realistic Occlusion for a Head Mounted Augmented Reality Display" Geisner et al., and filed Apr. 10, 2012, which is hereby incorporated by reference.

The 3D audio engine 304 is a positional 3D audio engine which receives input audio data and outputs audio data for the earphones 130 or other output audio devices like speakers in other embodiments. The received input audio data may be for a virtual object or be that generated by a real object. Audio data for virtual objects generated by an application can be output to the earphones to sound as if coming from the direction of the virtual object projected into the display field of view. An example of a positional 3D audio engine which may be used with an augmented reality system is disclosed in U.S. patent application Ser. No. 12/903,610 entitled "System and Method for High-Precision 3-Dimensional Audio for Augmented Reality," to Flaks et al., and filed Oct. 13, 2010, which is hereby incorporated by reference. Audio data from a sound library 312 may be associated with one or more collisions or actions for a particular physics model by an application or a user so that the 3D audio engine 304 will play the audio data during display of one or more collisions or actions.

Sound recognition software engine 194 of the 3D audio engine identifies audio data from the real world received via microphone 110 for application control via voice commands and for environment and object recognition. Based on a sound library 312, the engine 304 can identify a sound with a physical object, e.g. a horn sound associated with a certain make or model of car. Additionally, voice data files stored in user profile data 197 or user profiles 322 may also identify a speaker with whom a person object mapped in the environment may be associated. In addition to uploading their image data, display device systems 8 and 3D image capture devices 20 in a location upload their captured audio data to a hub computer system 12. Additionally, pre-generated 3D maps of a location can provide an audio index of sounds of objects fixed in the location or which enter and leave the location on a regular basis, e.g. train and bus sounds.

An embodiment of a natural user interface (NUI) in one or more embodiments of the display device system 8 may include the outward facing capture devices 113 and the gesture recognition engine 193 for identifying one or more user physical actions of gestures. The eye tracking system 134 and the eye tracking software 196 for interpreting eye movements based on the data captured by the system 134 may also be components in another embodiment of a natural user interface for the display device system 8. Eye based actions like a blink sequence indicating a command, a gaze pattern, or gaze duration identified by the eye tracking software 196 are also some examples of physical action user input. The microphone and sound recognition engine 194 can also process natural user input of voice commands which may also supplement other recognized physical actions such as gestures and eye gaze.

The gesture recognition engine 193 can identify actions performed by a user indicating a control or command to an executing application. The action may be performed by a body part of a user, e.g. a hand or finger, but also an eye blink sequence of an eye can be a gesture. In one embodiment, the gesture recognition engine 193 includes a collection of gesture filters, each comprising information concerning a gesture that may be performed by at least a part of a skeletal model. The gesture recognition engine 193 compares a skeletal model and movements associated with it derived from the captured image data to the gesture filters in a gesture library to identify when a user (as represented by the skeletal model) has performed one or more gestures. In some examples, matching of image data to image models of a user's hand or finger during gesture training sessions may be used rather than skeletal tracking for recognizing gestures.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about the gesture recognition engine 193 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

The physics engine 308 simulates the physics of motion of objects and the exchange of energy between objects as forces are applied to them based on rules governing a physical environment. In the illustrative examples discussed herein, Newton's laws of physics are used as the illustrative rules for a physical environment. An application can define different physical environment rules. For example, an environment having a different gravitational force than Earth's can be requested by inputting different environmental parameters.

Physics engine libraries 328 are used by the physics engine 308 in updating physics models and simulating actions and effects like collision effects, sound effects and visual effects. Some examples of physics engine libraries 328 are as follows. One or more materials lookup tables in the libraries 328 can be referenced by the physics engine 308 for identifying physics parameters like tensile strength and coefficients of friction for different types of materials. A pre-collision events library includes data for representing events or actions, for example a gesture, which signal or trigger a collision. For example, an object landing on a certain area in an environment may be a trigger for an explosion. An action simulator library includes software instructions for simulating movement of at least a part of an object based on input parameters of one or more physical properties. A collision effects library comprises software routines for simulating a change in at least one physical property of an object during or resulting from a collision based on different input parameters. For example, a collision effect may be a change in surface shape of an object to the collision. Other examples are different crack patterns or different breaking patterns for different materials or the same material in different orientations. The sound library 312, besides being a resource for command and object recognition based on sound, may also store audio data for sound effects to be played by the 3D audio engine 304 and which may be linked with different simulated actions, pre-collision events and collision effects. Similarly, a visual effects library may store routines for animations, highlighting, and other types of visual enhancements which may also be associated with particular actions, pre-collision events and collision effects. The libraries 328 also store previously generated or stored virtual objects physics models and real objects physics models. Persistent object identifiers may be associated with the physics models so once a real object is recognized as a previously recognized object, the physics model can be retrieved from storage rather than regenerated to save time. Similarly, virtual objects previously registered by one or more applications 166 can be retrieved from the library as well.

An application can register virtual objects and pre-collision events and the associated visual effects, sound effects, and collision effects for the triggered respective collisions via a software interface with the physics engine 308.

An application 166 communicates data with the virtual data engine 195 in order for the virtual data engine 195 to display and update display of one or more virtual objects controlled by the application 166.

Virtual data engine 195 processes virtual objects and registers the 3D position and orientation of virtual objects or imagery in relation to one or more coordinate systems, for example in display field of view coordinates or in the view independent 3D map coordinates. The virtual data engine 195 determines the position of image data of a virtual object or imagery in display coordinates for each display optical system 14. Additionally, the virtual data engine 195 performs translation, rotation, and scaling operations for display of the virtual data at the correct size and perspective. A virtual data position may be dependent upon, a position of a corresponding object, real or virtual, to which it is registered. The virtual data engine 195 can update the scene mapping engine about the positions of the virtual objects processed.

The following discussion describes some example processing for updating a see-through, augmented reality display to position virtual objects so that they appear realistically at 3D locations determined for them in the display. In one example implementation of updating the 3D display, the virtual data engine 195 renders the previously created three dimensional model of the display field of view including depth data for both virtual and real objects in a Z-buffer. The real object boundaries in the Z-buffer act as references for where the virtual objects are to be three dimensionally positioned in the display as the image generation unit 120 only displays the virtual objects as the display device is a see-through display device. For a virtual object, the virtual data engine 195 has a target 3D space position of where to insert the virtual object. In some examples, the virtual object target position is registered to a position of a real world object, and in other examples, the virtual object is independent of a particular real object.

A depth value is stored for each display element or a subset of display elements, for example for each pixel (or for a subset of pixels). Virtual images corresponding to virtual objects are rendered into the same z-buffer and the color information for the virtual images is written into a corresponding color buffer. The virtual images include any modifications to virtual image data based on collision processing. In this embodiment, the composite image based on the z-buffer and color buffer is sent to image generation unit 120 to be displayed at the appropriate pixels. The display update process can be performed many times per second (e.g., the refresh rate).

For a video-see, augmented reality display or operation of a see-through display in a video-see mode, image data of the real objects is also written into the corresponding color buffer with the virtual objects. The opacity filter of each see-through display optical system 14 can be tuned so that light reflected from in front of the glasses does not reach the user's eye 140 and the 3D image data of both the real and virtual objects is played on the display.

Device data 198 may include an identifier for the computer system 8, a network address, e.g. an IP address, model number, configuration parameters such as devices installed, identification of the operating system, and what applications are available in the display device system 8 and are executing in the display device system 8 etc. Particularly for the see-through, augmented reality display device system 8, the device data may also include data from sensors or sensing units or determined from the sensors or sensing units like the orientation sensors in inertial sensing unit 132, the temperature sensor 138, the microphone 110, the electrical impulse sensing unit 128 if present, and the one or more location and proximity transceivers in location sensing unit 144.

User profile data, in a local copy 197 or stored in a cloud based user profile 322 has data for user permissions for sharing or accessing of user profile data and other data detected for the user like location tracking, objects identified which the user has gazed at, biometric data or determined states of being of the user.

The real controller device interface software 188 communicates over a network 50 with the device interface software 189 of a real controller device 21. As listed in previous examples, the communication network 50 may be one suited for a multi-computer environment using protocols like Ethernet and WiFi or a network 50 may be a communication link set up between two devices using a protocol like Bluetooth or an IR based protocol. In other examples, the real controller device 21 and the display device system 8 can communicate directly over a wire. There may be a registration protocol between the controller device 21 and the interface software 188, and the operating system 190 or the interface software 189 notifies one or more executing applications 166 of the communication connection with the real controller device 21. In this example, an application 166 identifies for the real controller device interface software 188 a corresponding application real controller command input table 349 which identifies and links input data from the device interface software 188 with actions identified by the application for in the context of its operation. As discussed in the method embodiment figures below, the real controller device interface software 188 identifies a virtual object for control by the real controller device 21, determines a user perspective of the virtual object, applies the user input from the controller 21 requesting an action to be performed from the user perspective by indicating display instructions to the virtual data engine 195 or the application 166. The application 166 may identify an operation not allowed by the application 166 or may allow incorporate the display instructions which it provides to the virtual data engine 195.

The technology may be embodied in other specific forms without departing from the spirit or essential characteristics thereof. Likewise, the particular naming and division of modules, routines, applications, features, attributes, methodologies and other aspects are not mandatory, and the mechanisms that implement the technology or its features may have different names, divisions and/or formats.

For illustrative purposes, the method embodiments below are described in the context of the system embodiments described above. However, the method embodiments are not limited to operating in the system embodiments described above and may be implemented in other system embodiments. Furthermore, the method embodiments are continuously performed while the display device is in operation and an applicable application is executing.

Figure 5:
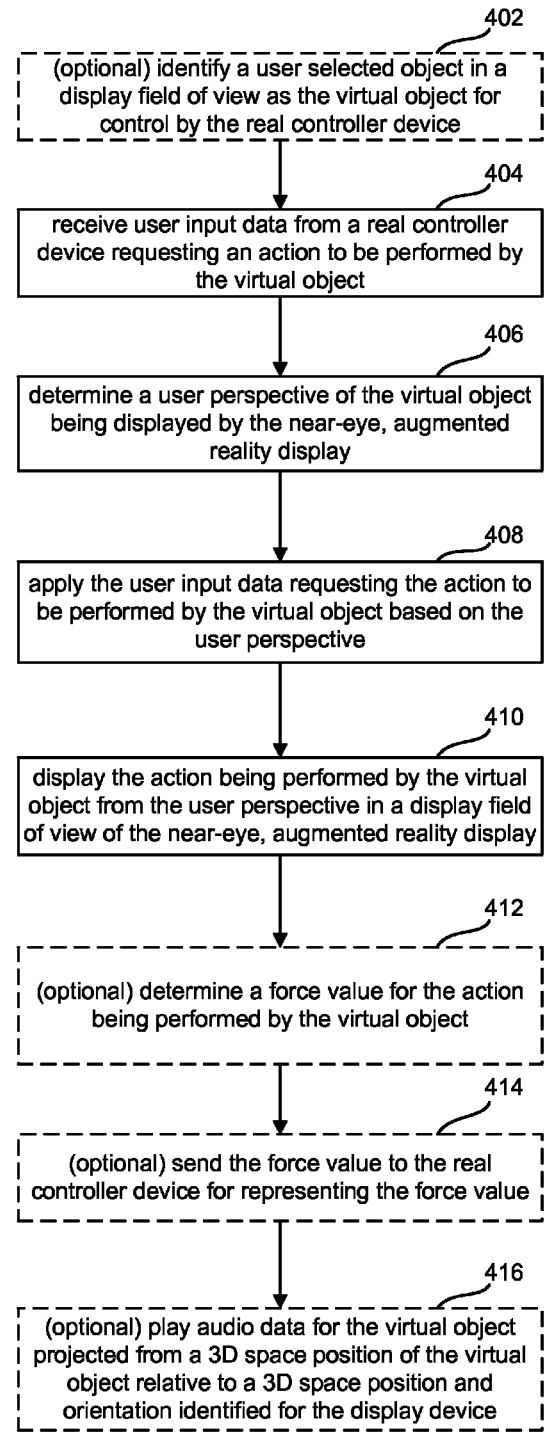
FIG. 5 is a flowchart of an embodiment of a method for controlling a virtual object displayed by a near-eye, augmented reality display with a real controller device.

FIG. 5 is a flowchart of an embodiment of a method for controlling a virtual object displayed by a near-eye, augmented reality display with a real controller device. In some applications, for example a game for the helicopter in FIGS. 3A through 3E, an application designates a virtual object to be controlled by the real controller device 21. In other examples, the user selects an object to be controlled by the real controller device. In optional step 402, the real controller device interface software 188 or an application 166 identifies a user selected object in a display field of view of the near-eye AR display as the virtual object for control by the real controller device 21. The identification may be based on NUI input data. For example, a selection gesture like pointing one's finger may be identified by the gesture recognition engine 193 and a notification sent to the operating system identifying the selection gesture and the object to which it is related. In another example, a gaze duration period and the real or virtual object which is the point of gaze in the display field of view for the duration may be identified by the eye tracking software 196. In other examples, non-NUI input like moving a displayed selection arrow with the real controller device may be used to identify a user selected object for control or force feedback as discussed below.

In step 404, the real controller device interface software 188 receives user input data from a real controller device requesting an action to be performed by the virtual object, and in step 406 determines a user perspective of the virtual object being displayed by the near-eye, augmented reality display. In some examples, the user perspective may be referenced to the a reference point on the display device which acts as an origin of the view dependent coordinate system for the display field of view in which the depth axis extends from the reference point of the display device into the display field of view. The 3D space position and orientation of the virtual object in the view dependent coordinate system approximates how the object is seen by the user which is another way of saying the approximated perspective of a user wearing the display device 2.

In step 408, the real controller device interface software 188 applies the user input data requesting the action to be performed by the virtual object based on the user perspective. An example of applying the user input based on or from the user perspective is determining any direction associated with the action to be performed by the virtual object based on the user perspective. In another example, a user may be adding features like stickers to a car. The side of the car closest to the view dependent coordinate system origin in the display field of view is displayed with the added sticker. See FIGS. 3A through 3E for illustrative examples of directions determined from the user perspective. The user input as applied to the virtual object based on the user perspective is identified to the virtual data engine 195 which in step 410 displays the action being performed by the virtual object from the user perspective.

Optionally, in step 412, the physics engine 308 determines a force value for the action being performed by the virtual object based at least in part on physical properties of the virtual object and action parameters some examples of which are speed and acceleration of the virtual object, medium of travel like air or water or dirt or surface of travel like couch cushion surface, hardwood floor, dirt, grass, etc. Some examples or what the force value represents is a force being directed at the virtual object or a force being asserted by the virtual object, or a force impact on another object as discussed further below. In optional step 414, the real controller device interface software 188 send the force value to the device interface software 189 executing on the real controller device for representing the force value by a force feedback mechanism. Additionally, in optional step 416, the 3D audio engine 304 plays audio data for the virtual object projected from a 3D space position of the virtual object relative to a 3D space position and orientation identified for the display device which is used to approximate the position and orientation of the user's head supporting the display device. In the helicopter examples, a flight path of the virtual helicopter currently has it on course to fly into a wall behind the user. The user gets distracted and does not change the path via user input. The virtual helicopter is no longer displayed in the display field of view, but the 3D audio engine 304 plays the audio of the virtual crash to project from a position of the wall behind the user.

A user may select a real object to be controlled by the real controller device 21. As in the examples of FIGS. 8A through 8D, a virtual object representing the real object can be generated and controlled by the data received from the real controller device 21. The virtual data engine 195 can create a virtual object for the real object based on the object physical properties data set $320_N$ determined by the object recognition engine 192 for it, and the physics engine 308 can receive a request from the real controller device interface software 188 to generate a physics model for the real object from which display data for realistic actions and collision effects for the real object. If the near-eye AR display device system includes a video-see display or is operating in a video-see mode, a virtual object representation of the real object may already exist.

Figure 6A:
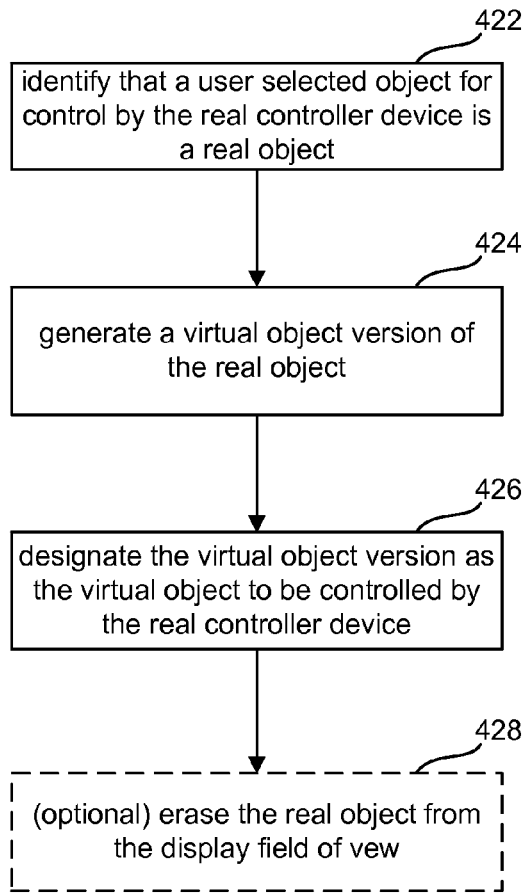
FIG. 6A is a flowchart of an embodiment of a process for representing a user selected real object being controlled by a real controller device in a display field of view.

FIG. 6A is a flowchart of an embodiment of a process for representing a user selected real object being controlled by a real controller device in a display field of view. The real controller device interface software 188 in step 422 identifies that a user selected object for control by the real controller device is a real object and has the virtual data engine 195 in step 424 generate a virtual object version or representation of the real object which virtual object version the interface software 188 designates in step 426 as the virtual object to be controlled by the real controller. In some embodiments, as an optional step, the interface software 188 can send a request for an erase procedure to be applied to the real object being represented by the virtual object to the virtual data engine 195 for more realism.

In optional step 428, the virtual data engine 195 erases the real object from the display field of view. As the display device 2 is providing a 3D display, the erasing is performed with respect to a position volume for the real object. As part of the 3D mapping process, there may be stored data for the environment without the real object, or if a movable object, the capture devices 113 may have captured image and depth data from the current session identifying what is currently behind and in front of the real object. From image data of the scene behind the real object, separate image data captured of each real object in the scene can be generated and projected at its current identified depth position to occlude the real object. This allows image data of a virtual object to be inserted at its proper depth in the display field of view which may be behind the erased real object.

Figure 6B:
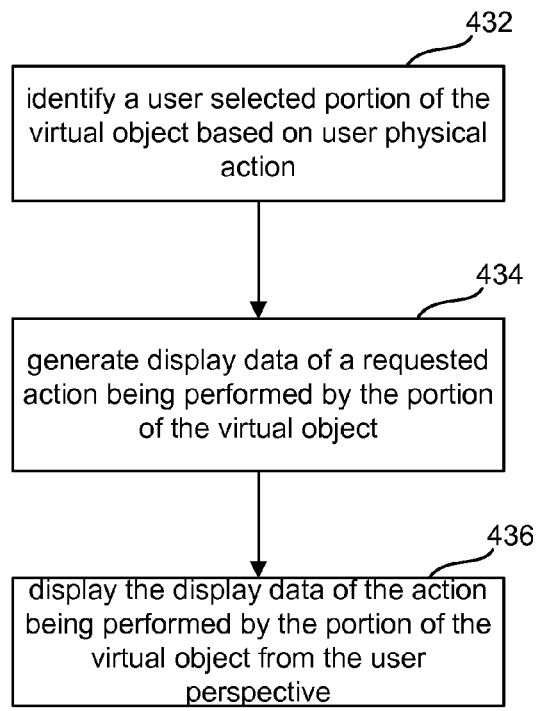
FIG. 6B is a flowchart of an embodiment of a process for applying user input data for the requested action from the real controller device to a user selected portion of a virtual object.

The action requested to be performed by the virtual object may be an action to be performed by a user selected portion of the virtual object. FIG. 6B is a flowchart of an embodiment of a process for applying user input data for the requested action from the real controller device to a user selected portion of a virtual object. A user selected portion of the virtual object for performing the action requested in the user input data received from the real controller device is identified. In the embodiment of FIG. 6B, NUI input data identifies the selected portion. In step 432, the real controller device interface software 188 identifies the user selected portion of the virtual object based on user physical action of a body part identified in the NUI input data. For example, the user physical action may be a gaze duration determined based on point of gaze and duration of gaze data in the display field of view and the 3D mapping of objects in the display field of view. The interface software 188 in step 434 generates display data of a requested action being performed by the portion of the virtual object. As illustrated in FIG. 3F, depending on the structural relationship of the portion to the whole object, other parts of the object may also be effected by the action. In step 436, the virtual data engine 195 displays the display data of the action being performed by the portion of the virtual object from the user perspective. For example, see again FIGS. 3E and 3F.

Figure 7A:
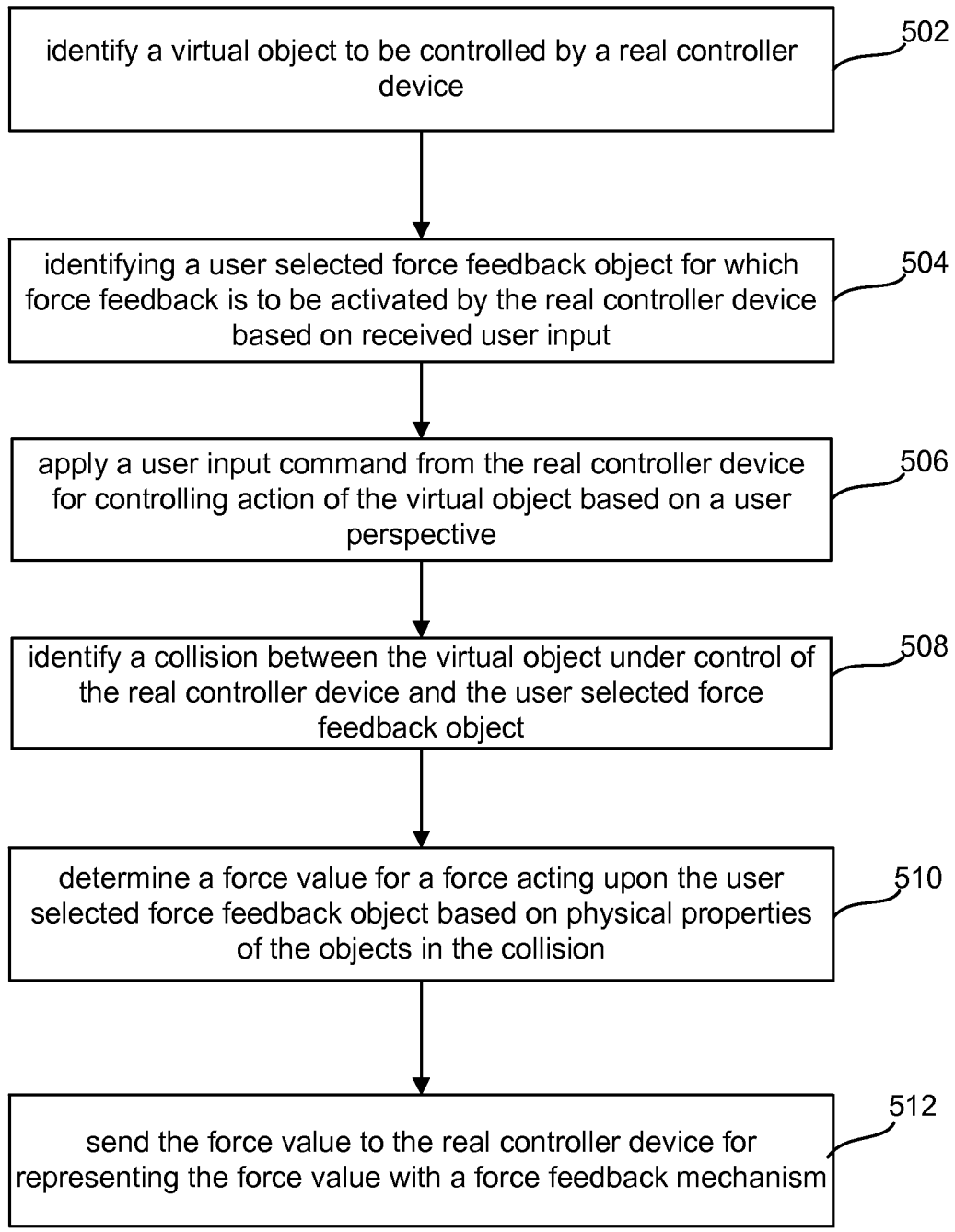
FIG. 7A is a flowchart of an embodiment of a method for providing force feedback for a user selected force feedback object by a real controller device with a force feedback mechanism providing input data to a near-eye augmented reality display device system.

FIG. 7A is a flowchart of an embodiment of a method for providing force feedback for a user selected force feedback object by a real controller device with a force feedback mechanism providing input data to a near-eye augmented reality display device system. In step 502, the real controller device interface software 188 identifies a virtual object to be controlled by a real controller device. For example, a message may be received from an application identifying the virtual object or user input may be received identifying the virtual object for control. Received user input data in step 504 to the interface software 188 identifies a user selected force feedback object for which force feedback is to be activated by the real controller. The user input may be a menu selection of identified objects or NUI input like a gesture, voice, eye data or a combination of these.

In step 506, the real controller device interface software 188 applies user input commands determined based on data received from the real controller device for controlling action of the virtual object based on the user perspective. In step 508, a collision is identified between the virtual object under control of the real controller and the user selected force feedback object. Either the scene mapping engine 306 or an application 166 may identify the collision based on object 3D space position data for the virtual object and the user selected force feedback object from a 3D mapping of the user environment tracking the positions of the objects. The collision may occur inside or outside the display field of view but one or more forces associated with the collision may be modeled by the physics engine 308 based on the properties of the virtual object and the force feedback object and collision parameters like the speed and acceleration of each object. Based on the collision modeling performed by the physics engine 308 and the collision being in the display field of view, the virtual data engine 195 displays the collision from the user perspective.

In step 510, a force value for a force acting upon the user selected force feedback object is determined based on physical properties (e.g. as identified in object physical properties data sets $320_N$) of the objects in the collision. The physics engine 308 notifies the real controller device interface software 188 of the force value, and the interface software 188 sends the force value in step 512 to the device interface software 189 of the real controller device which will cause the real controller device to represent the force value with a force feedback mechanism.

Figure 7B:
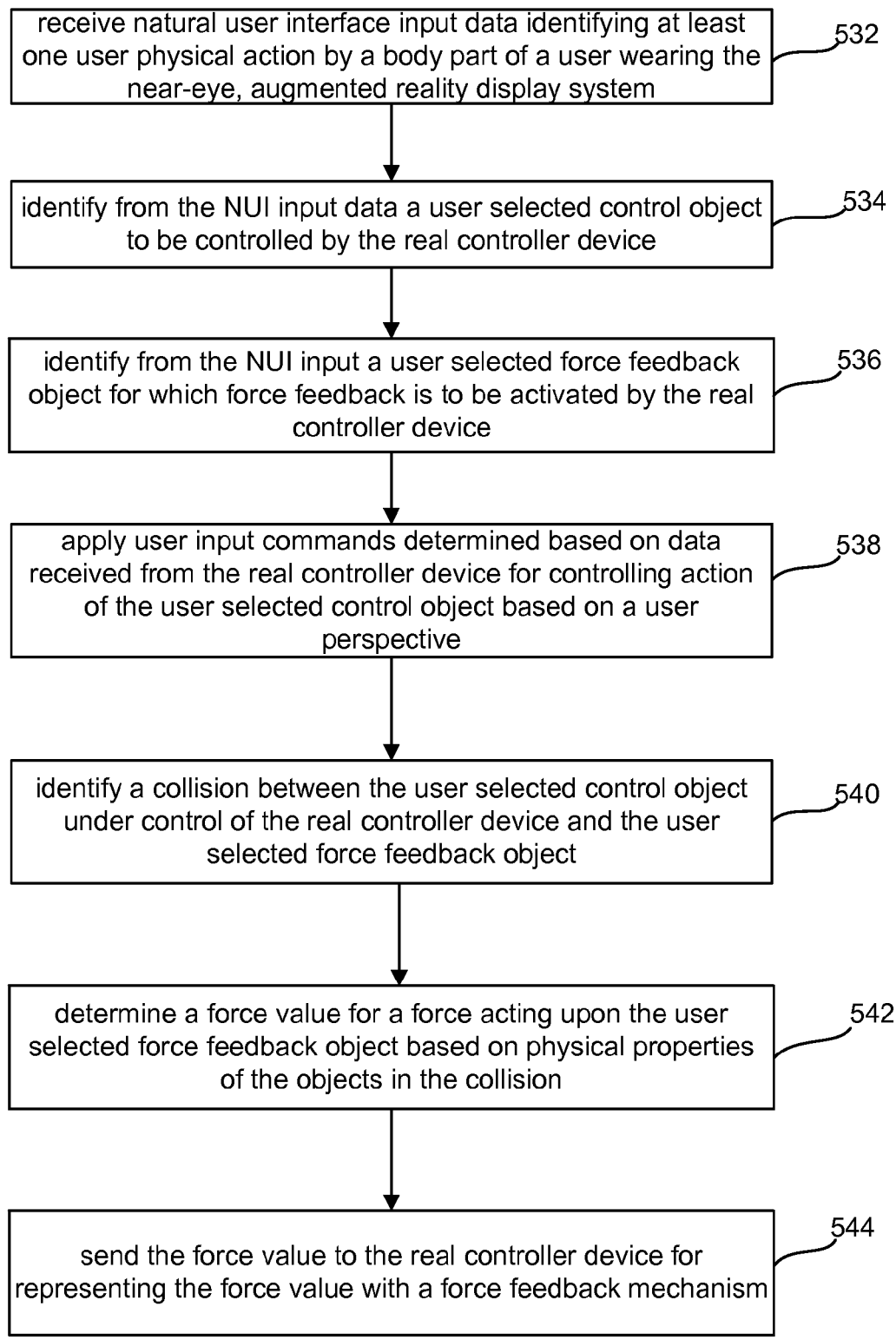
FIG. 7B is a flowchart of another embodiment of a method for providing force feedback for a user selected force feedback object by a real controller device with a force feedback mechanism providing input data to a near-eye augmented reality display device system.

FIG. 7B is a flowchart of another embodiment of a method for providing force feedback for a user selected force feedback object by a real controller device with a force feedback mechanism providing input data to a near-eye augmented reality display device system. In this embodiment, natural user interface input data is received in step 532 which identifies at least one user physical action by a body part of a user wearing the near-eye, augmented reality display system. For example, the capture devices 113 can capture data of the user's hand and finger pointing to different objects and identifying them as a control object or a force feedback object or both, and the image and depth data is processed by the gesture recognition engine 193 for identifying a pointing selection gesture.

In step 534, a user selected control object to be controlled by the real controller device is identified from the NUI input data, and in step 536, a user selected force feedback object for which force feedback is to be activated by the real controller device is identified. In step 538, the real controller device interface software 188 applies user input commands determined based on data received from the real controller device for controlling action of the user selected control object based on the user perspective. As discussed above for step 508, in step 540, a collision is identified between the user selected control object under control of the real controller device and the user selected force feedback object. The collision is displayed from the user perspective if within the display field of view.

In step 542, a force value for a force acting upon the user selected force feedback object is determined based on physical properties of the objects in the collision and the interface software 188 sends the force value in step 544 to the device interface software 189 of the real controller device which will cause the real controller device to represent the force value with a force feedback mechanism.

In the embodiments of FIGS. 7A and 7B, one or more objects, either virtual or real, may be selected as one or more force feedback objects. In some examples where force values for more than one object in a collision are represented, the force values for the different objects can be represented by the force feedback mechanism in a sequence. The sequence may be determined by an application 166 based on user input, rule logic of the application, or both. For example, a force value for a force feedback object impacted by a virtual object controlled by the real controller device may be represented followed a force value representing the reaction force directed at the controlled virtual object. Additionally, in some examples, there may be multiple force feedback objects in a collision with the virtual object, and the force values for each of these objects may be represented in a sequence determined based on criteria, an example of which is greatest to least force intensity value. A visual aid may be displayed on each object as its force value is represented.

Figure 8A:
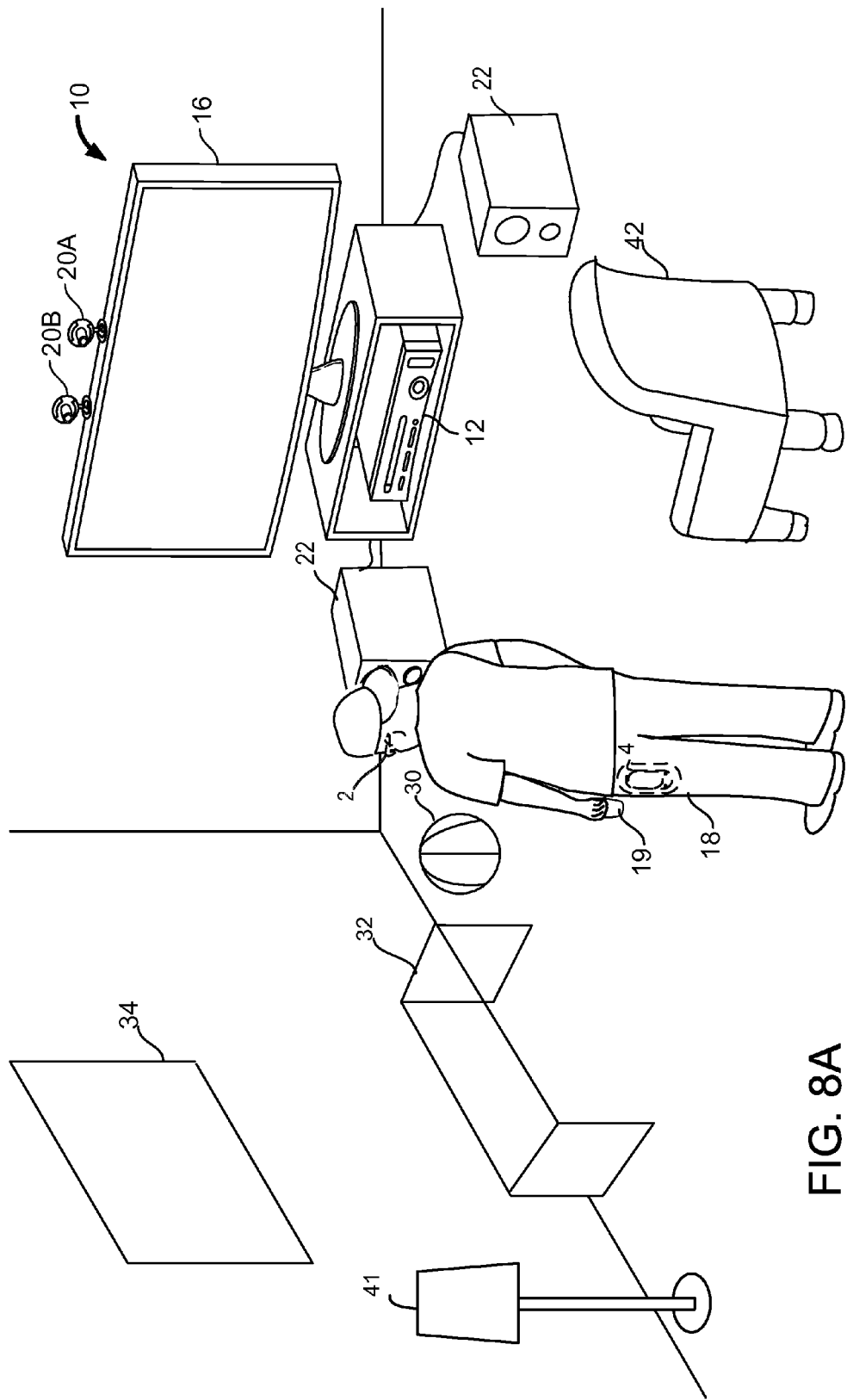
FIG. 8A illustrates a contextual example of a user wearing an augmented reality display device system selecting via gaze a real object to be controlled with a real controller device in a contextual example of a user environment as a living room.

FIG. 8A illustrates a contextual example of a user wearing an augmented reality display device system selecting via gaze a real object to be controlled with a real controller device in a contextual example of a user environment as a living room. A user 18, hereafter referred to as "Joe" for illustration is in his living room which includes real objects like a lamp 41, a table 32, a wall hanging 34, a basketball 30, a chair 42 and a home entertainment system 10 including 3D image capture devices 20A and 20B, a television 16, speakers 22, and a game console as a network accessible computer system 12. In this embodiment, Joe's display device system 8 includes a near-eye, AR display device 2 in communication with a smartphone embodiment of a companion processing module 4. Joe is holding a handheld IMU real controller device 19 in this example which has established communication with his display device system 8 (e.g. 2 and 4). The eye tracking system 134 and the eye tracking software 196 operate to identify NUI input of Joe's gaze duration at real basketball 30 which in this example is identified as user input selecting the basketball as an object to be controlled by the handheld IMU.

Figure 8B:
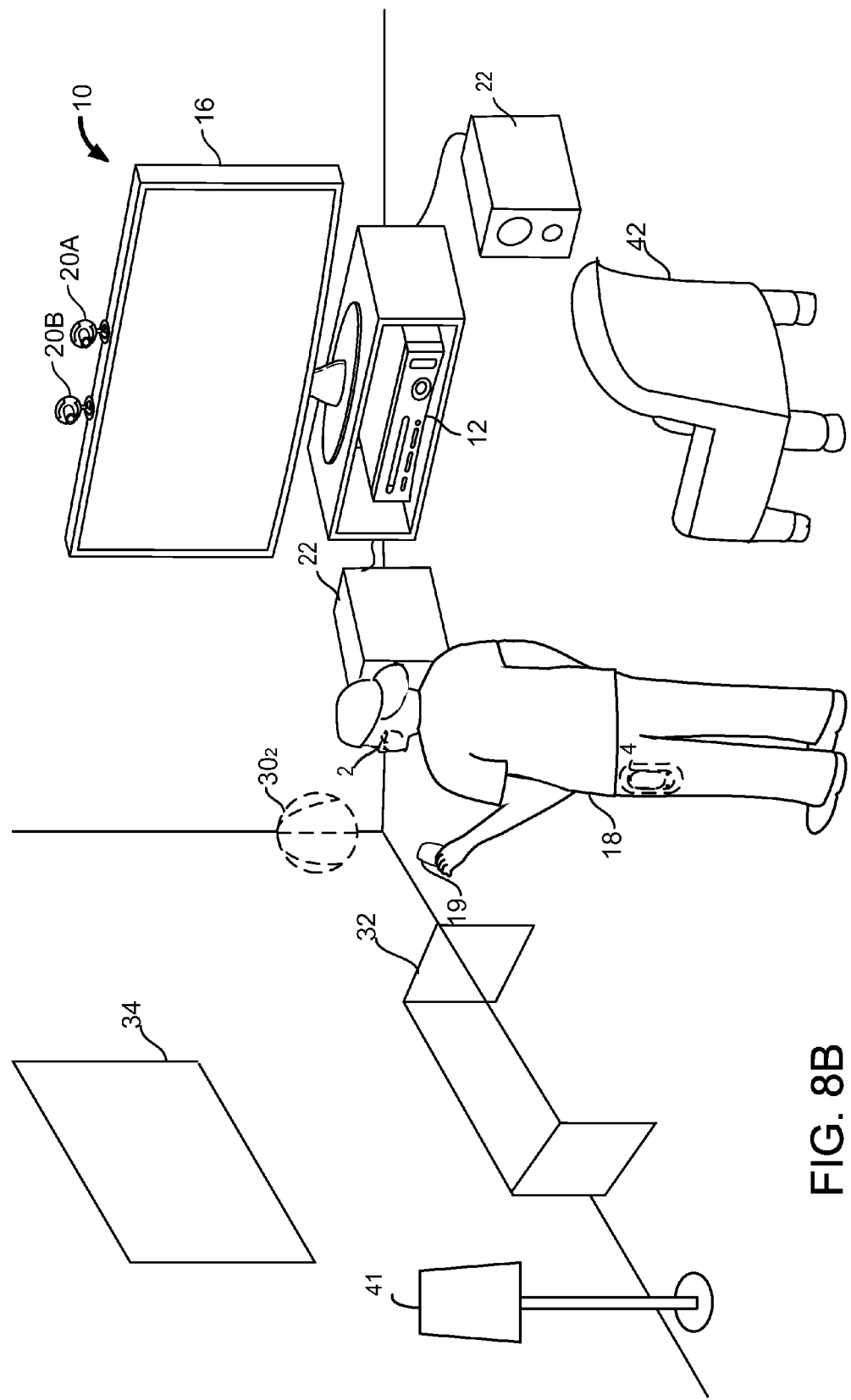
FIG. 8B illustrates an example of a virtual object representation of the user selected real object being controlled with the real controller device.

FIG. 8B illustrates an example of a virtual object representation of the user selected real object being controlled with the real controller device. The changes in position and orientation of the handheld controller causes its inertial motion unit to generate one or more signals which are converted by the handheld IMU real controller device 19 to be user input requesting display of an action by the virtual object $30_2$ representing the real basketball based on the user perspective. In this example, the movement of the real controller device 19 up by the user has translated into an up action to be applied to the basketball virtual object $30_2$ which the user sees from his perspective as he is looking straight at the virtual basketball $30_2$. The real basketball 30 has been erased in this example.

Figure 8C:
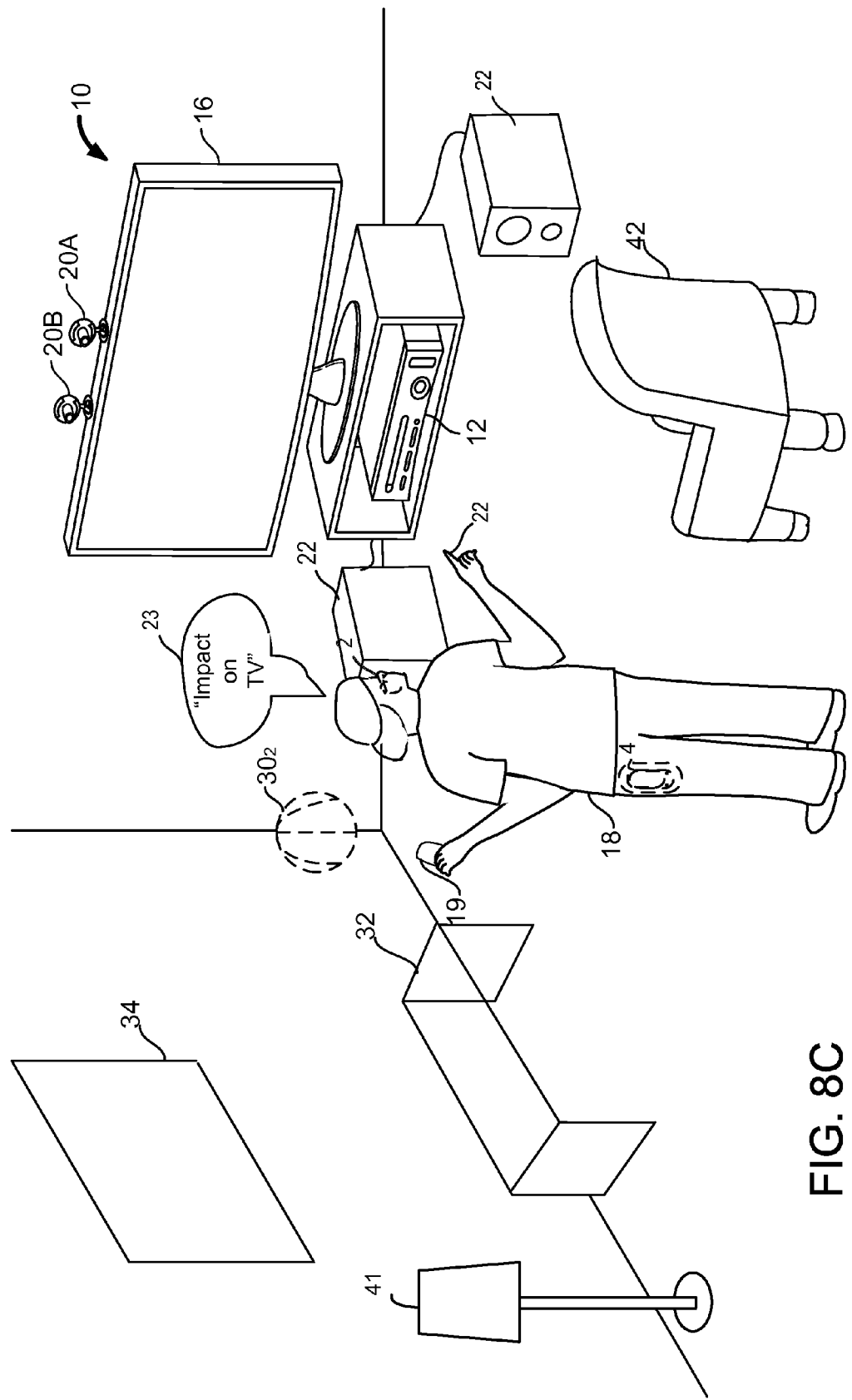
FIG. 8C illustrates an example of NUI input including a gesture for selecting a force feedback object in continuing the example of FIGS. 8A and 8B.

FIG. 8C illustrates an example of NUI input including a gesture for selecting a force feedback object in continuing the example of FIGS. 8A and 8B. In this example, capture devices 113 of Joe's display device capture at least image data and perhaps depth data of his finger pointing gesture 22 which is identified as an object selection gesture by the gesture recognition engine 193. Microphone 110 captures his speech 23 of "Impact on TV" which the speech recognition engine 194 links to a command word "Impact" indicating a request for force feedback from the real controller device 19 and "TV" as an object name indicating the selected force feedback object is the television 16. Gaze data may also have been used rather than a gesture. In this example, other objects in the living, for example the table 32 and the chair 42 may also have been selected as force feedback objects. Additionally, another virtual object may have been selected as the force feedback object.

Figure 8D:
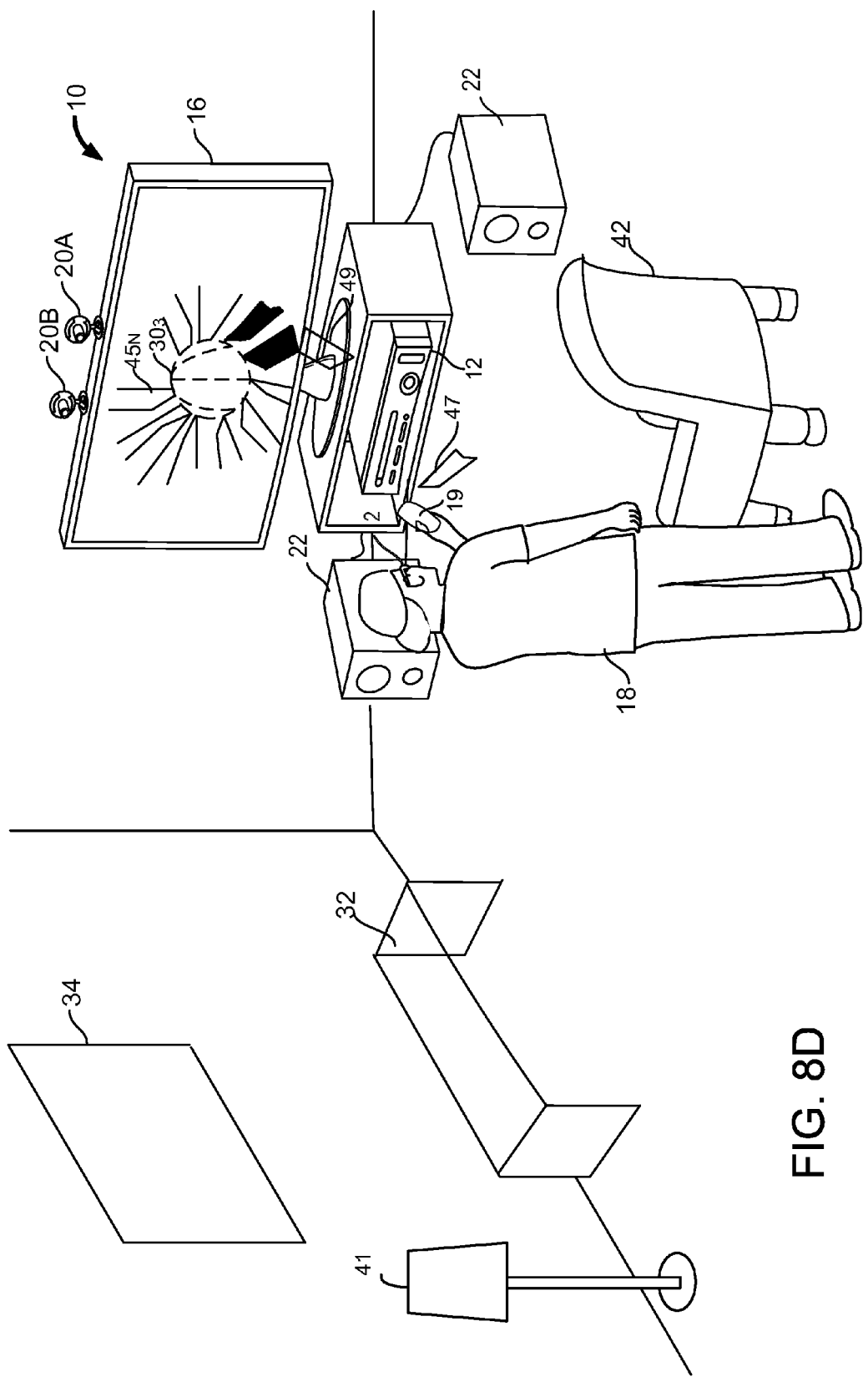
FIG. 8D illustrates an example of a simulated effect on a physical state of the user selected force feedback object due to a collision with the virtual object representation of the user selected control real object in the continuing example of FIGS. 8A, 8B and 8C.

FIG. 8D illustrates an example of a simulated effect on a physical state of the user selected force feedback object due to a collision with the virtual object representation of the user selected control real object in the continuing example of FIGS. 8A, 8B and 8C. Inertial motion sensors (not shown) in the handheld real controller device 19 identify parameters like speed, acceleration and direction of motion of the device 19 which is sent as data to the display device system 8. Joe has moved the handheld IMU device with such an intensity in the direction of the television 16 that the virtual basketball 303 collides with the display of the television. The physics engine 308 models the collision and the virtual data engine 195 displays a collision effect selected by the physics engine 308 based on the properties of the real basketball 30 and the real television 16 in which the display of television 16 not only cracks, as illustrated by cracks like path representative crack 45N, but breaks resulting in glass pieces 49 and 47 separating from the display and falling to the ground, with the assistance of a gravity force component, from the vertical surface of television display. The cracking and breaking of the display is based on its physics model which is based on realistic physical properties of the display of television 16. As the television 16 was selected as the force feedback object, the handheld IMU 19 force feedback mechanism generates a sensation to represent a force, likely a composite force, directed at the television due to a collision with a real basketball 30 traveling in the direction with the speed and acceleration indicated by the handheld IMU real controller device 19.

For more information about a physics engine like physics engine 308 which models virtual and real objects, and collisions, and collision effects for a near-eye, AR display, see U.S. patent application Ser. No. 13/458,800, McCulloch et al., entitled "Displaying a Collision Between Real and Virtual Objects," filed Apr. 27, 2012, which is hereby incorporated herein by reference.

FIG. 9 is a block diagram of one embodiment of a computing system that can be used to implement one or more network accessible computer systems 12 or a companion processing module 4 which may host at least some of the software components of computing environment 54 or other elements depicted in FIG. 4A. With reference to FIG. 9, an exemplary system includes a computing device, such as computing device 900. In its most basic configuration, computing device 900 typically includes one or more processing units 902 including one or more central processing units (CPU) and one or more graphics processing units (GPU). Computing device 900 also includes memory 904. Depending on the exact configuration and type of computing device, memory 904 may include volatile memory 905 (such as RAM), non-volatile memory 907 (such as ROM, flash memory, etc.) or some combination of the two. This most basic configuration is illustrated in FIG. 9 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 9 by removable storage 908 and non-removable storage 910.

Device 900 may also contain communications connection(s) 912 such as one or more network interfaces and transceivers that allow the device to communicate with other devices. Device 900 may also have input device(s) 914 such as keyboard, mouse, pen, voice input device, touch input device, etc. Output device(s) 916 such as a display, speakers, printer, etc. may also be included. All these devices are well known in the art so they are not discussed at length here.

The example computer systems illustrated in the figures include examples of computer readable storage devices. A computer readable storage device is also a processor readable storage device. Such devices may include volatile and non-volatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can be accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling a virtual object displayed by a near-eye, augmented reality display of a near-eye, augmented reality display system communicatively coupled with a real controller device comprising:
   identifying a user selected object in a display field of view of the near-eye, augmented reality display system for control by the real controller device by one or more processors of the near-eye, augmented reality display system based on user input detected by one or more of the group consisting of one or more sensors of the near-eye, augmented reality display system or the real controller device;

translating one or more physical touch based actions being performed with respect to one or more touch activated parts of the real controller device to user input data;

receiving by the one or more processors of the near-eye, augmented reality display system the user input data from the communicatively coupled real controller device, the user input data representing a request for an action to be performed by the user selected object;

identifying that the user selected object for control by the real controller device is a real object;

generating a virtual object version of the real object;

designating the virtual object version as a virtual object to be controlled by the real controller device;

erasing the real object from the display field of view of the near-eye, augmented reality display system;

determining by the one or more processors a user perspective of the virtual object being displayed by the near-eye, augmented reality display;

applying the user input data requesting the action to be performed by the virtual object based on the user perspective; and displaying the action being performed by the virtual object from the user perspective in a display field of view of the near-eye, augmented reality display.

2. The method of claim 1 wherein identifying the user selected object in the display field of view for control by the real controller device further comprises:

detecting natural user interface input data including at least one user physical action of a user wearing the near-eye, augmented reality display system by the near-eye, augmented reality display system; and identifying the user selected object based on the natural user interface input data.

3. The method of claim 1 wherein applying the user input requesting the action to be performed by the virtual object based on the user perspective further comprises:

determining any direction associated with the action to be performed by the virtual object based on the user perspective.

4. The method of claim 1 wherein applying the user input data requesting the action to be performed by the virtual object based on the user perspective further comprising:

identifying a user selected portion of the virtual object for performing the action requested in the user input data received from the real controller device;

generating display data of the requested action being performed by the portion of the virtual object; and displaying the action being performed by the virtual object from the user perspective further comprises displaying the display data of the action being performed by the portion of the virtual object from the user perspective.

5. The method of claim 4 wherein identifying the user selected portion of the virtual object for performing the action requested in the user input data received from the real controller device further comprises:

identifying the user selected portion of the virtual object based on user physical action identified in natural user interface input data.

6. The method of claim 1 wherein determining the user perspective of the virtual object being displayed by the near-eye, augmented reality display further comprises:

determining the user perspective based on a 3D space position and orientation data for the virtual object in the display field of view.

7. The method of claim 1 further comprising:

determining a force value for the action being performed by the virtual object; and sending the force value to the real controller device for representing the force value.

8. The method of claim 1 further comprising:

playing audio data for the virtual object projected from a 3D space position of the virtual object relative to a 3D space position and an orientation identified for a display device including the near-eye, augmented reality display.

9. A system for controlling a virtual object displayed by a near-eye, augmented reality display with a real controller device comprising:

the near-eye augmented reality display having a display field of view including a real object and being supported by a near-eye support structure;

one or more processors being communicatively coupled to the near-eye, augmented reality display for controlling the display;

the one or more processors being communicatively coupled to at least one capture device for receiving image data and depth data from which the one or more processors determine a three dimensional (3D) mapping of the display field of view and the one or more processors determining a user perspective of the virtual object based on the 3D mapping of the display field of view;

the real controller device having one or more touch activated parts and translating one or more physical touch based actions with respect to the one or more touch activated parts to user input data;

one or more sensors being supported by the near-eye support structure, including the at least one capture device, for detecting user input;

the one or more processors identifying a user selected object in the display field of view for control by the real controller device based on user input detected by one or more of the group consisting of the one or more sensors being supported by the near-eye support structure or the real controller device, identifying that the user selected object for control by the real controller device is a real object, generating and causing the near-eye display to display a virtual object version of the real object, designating the virtual object version as a virtual object to be controlled by the real controller device, and erasing the real object from the display field of view of the near-eye display;

the one or more processors being communicatively coupled to the real controller device for receiving the user input data, the user input data representing a request for an action to be performed by the virtual object;

the one or more processors applying the user input data requesting the action to be performed by the virtual object based on the user perspective; and the one or more processors causing the near-eye, augmented reality display to display the action being performed by the virtual object from the user perspective.

10. The system of claim 9 further comprising:

a natural user interface, comprising the one or more sensors being supported by the near-eye support structure, including the at least one capture device, for detecting user input and a gesture recognition engine being executed by the one or more processors for identifying a user physical action of a gesture selecting the user selected object as the virtual object to be controlled by the real controller device based on the captured image and depth data.

11. The system of claim 9 further comprising:
a natural user interface, comprising the one or more sensors being supported by the near-eye support structure, including the at least one capture device, for detecting user input and an eye tracking system being positioned by the support structure and eye tracking software being executed by the one or more processors for identifying a user physical action of an eye based action based on eye data from the eye tracking system; and
the one or more processors identifying the user selected object as the virtual object to be controlled by the real controller device in the display field of view based on the eye based action.

12. The system of claim 9 further comprising:
the real controller device is a hand held controller comprising at least one of the following:
a joystick;
a steering wheel;
a gamepad;
a touch pad;
a multi-point touch pad;
a handheld inertial motion unit (IMU); and
a controller associated with a game console.

13. The system of claim 9 further comprising:
the real controller device comprises a force feedback mechanism;
the one or more processors determine a force value for the action being performed by the virtual object based on physical properties associated with the virtual object; and
the one or more processors sending the force value to the real controller device for activating the force feedback mechanism for representing the force value.

14. The system of claim 9 wherein the near-eye, augmented reality display is an optical see-through, augmented reality display.

15. One or more processor readable storage devices comprising instructions which cause one or more processors to execute a method for providing force feedback for a user selected force feedback object by a real controller device providing input data to a near-eye augmented reality display device system, the method comprising:
identifying a virtual object to be controlled by a real controller device;
identifying a user selected force feedback object for which force feedback is to be activated by the real controller device based on received user input;
applying a user input command received from the real controller device for controlling action of the virtual object based on a user perspective; and
identifying a collision between the virtual object under control of the real controller device and the user selected force feedback object;
determining a force value for a force acting upon the user selected force feedback object based on physical properties of the virtual object and the user selected force feedback object in the collision;
and sending the force value to the real controller device for representing the force value.

16. The one or more processor readable storage devices of claim 15 wherein identifying the virtual object to be controlled by the real controller device further comprises:
receiving natural user interface input data identifying at least one user physical action by a body part of a user wearing the near-eye, augmented reality display system, and
identifying from the natural user interface input data a user selected control object to be controlled by the real controller device.

17. The one or more processor readable storage devices of claim 15 wherein identifying the user selected force feedback object for which force feedback is to be activated by the real controller device based on received user input further comprises identifying from natural user interface input data the user selected force feedback object.

* * * * *